United States Patent
Koenig

(10) Patent No.: US 9,921,291 B2
(45) Date of Patent: Mar. 20, 2018

(54) MULTI-TIERED DISTANCE TRAVELLED ESTIMATOR

(71) Applicant: QUALCOMM Incorporated, San Diego, CA (US)

(72) Inventor: Michael Stephen Koenig, Mission Viejo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 15/093,632

(22) Filed: Apr. 7, 2016

(65) Prior Publication Data

US 2017/0293013 A1 Oct. 12, 2017

(51) Int. Cl.
- *G01S 3/02* (2006.01)
- *G01S 5/02* (2010.01)
- *H04W 4/02* (2018.01)

(52) U.S. Cl.
CPC .......... *G01S 5/0252* (2013.01); *G01S 5/0263* (2013.01); *H04W 4/023* (2013.01)

(58) Field of Classification Search
CPC ................................ G01S 5/0252; G01S 5/14
USPC ................ 342/357.2, 357.21, 451, 457, 458; 701/468, 469
See application file for complete search history.

(56) References Cited

U.S. PATENT DOCUMENTS

| 4,774,671 | A  | 9/1988 | Itoh et al. |
| 5,742,923 | A  | 4/1998 | Odagawa |
| 6,192,312 | B1 | 2/2001 | Hummelsheim |
| 8,204,684 | B2 | 6/2012 | Forstall et al. |
| 2007/0187554 | A1 | 8/2007 | Bitar et al. |
| 2014/0046582 | A1 | 2/2014 | Tijink et al. |
| 2014/0046583 | A1 | 2/2014 | Tijink et al. |

FOREIGN PATENT DOCUMENTS

EP  1736932 A1  12/2006

OTHER PUBLICATIONS

International Search Report and Written Opinion—PCT/US2017/022079—ISA/EPO—Jun. 8, 2017.

*Primary Examiner* — Dao L Phan
(74) *Attorney, Agent, or Firm* — Silicon Valley Patent Group LLP

(57) ABSTRACT

Techniques are provided which may be implemented using various methods and/or apparatuses in a mobile device to perform a distance travelled estimate with a mobile device. The distance travelled estimate is performed by determining a quality of displacement between a base position and each new position for the mobile device, which is determined based on the displacement between the positions and their associated uncertainties. If the quality of displacement is sufficient, the distance travelled estimate is updated using the displacement between the positions. Multiple tiers may be used, where, for example, if the quality of displacement is sufficiently high, the displacement associated with a preceding position may be excised from the distance travelled estimate and replaced with the displacement associated with the new position. Additionally, if the quality of displacement is even greater, the new position may be set as the base position.

34 Claims, 10 Drawing Sheets

MULTI-TIERED DISTANCE TRAVELLED ESTIMATOR

BACKGROUND

1. Field

The subject matter disclosed herein relates to electronic devices, and more particularly to methods and apparatuses for use in or with a mobile device to measure distance travelled.

2. Information

Distance travelled estimation is used by, e.g., in fitness trackers, to provide the user with an estimate of how far the user has walked or ran. Of course, distance travelled estimates may be used in other applications, such as with mariners, pilots, hikers, etc., in order to estimate how far the user has travelled. An estimate of distance travelled may be generated, e.g., electronically using measurements from a Global Navigation Satellite System (GNSS) and/or measurements of signals received from terrestrial transmitters fixed at known locations. An estimate of distance travelled may be generated based on other type of position estimates, including position estimates that are not absolute. For example, a relative position fix within a framework (e.g., navigating inside a shopping Mall) or purely a relative framework may be used to estimate distance travelled as the distance travelled is relative to a starting position and not necessarily an absolute position. The distance travelled estimate, for example, may be generated by adding together the lengths between multiple position estimates. Accordingly, to produce an accurate distance travelled estimate, it is typically advantageous to make frequent position measurements. Moreover, for an accurate estimate of the distance travelled, it is advantageous for position measurement to be accurate. Unfortunately, frequent, highly accurate, position measurements requires a large amount of power and, consequently, may quickly drain the battery of the electronic device. Performing less frequent and/or inaccurate position measurements, typically results in error being introduced into the distance travelled estimate.

Moreover, continuously estimating the total distance traveled by adding together the segment lengths between position estimates leads to a significant accumulation of error. The accumulation of error is exacerbated if the position fixes are infrequent and/or if there is a significant error in the position estimates. Moreover, due to variable correlation between position estimates, it is difficult to estimate the error in the distance travelled estimate.

SUMMARY

Some example techniques are presented herein which may be implemented in various method and apparatuses in a mobile device to possibly provide for or otherwise support performing a distance travelled estimate in a mobile device. The distance travelled estimate may be performed using a quality of displacement between position estimates determined based on the displacement between a base position and each new position for the mobile device, which is determined based on the displacement between the positions and their associated uncertainties. If the quality of displacement is sufficient, the distance travelled estimate is updated based on the displacement between the base position and the new position. Multiple tiers may be used, where, for example, if the quality of displacement is sufficiently high, the displacement from a preceding position to the base position may be excised from the distance travelled estimate and replaced with the displacement between the new position and the base position. Moreover, if the quality of displacement is even greater, the new position may be set as a new base position. Additional criteria may be used in the updating of the distance travelled estimate, including time and variations in direction of travel.

In accordance with an example implementation, a method may be provided which comprises, obtaining a base position for the mobile device, the base position having an associated base uncertainty; obtaining a first set of signals for position determination with the mobile device; determining a first position of the mobile device with the first set of signals, the first position having an associated first uncertainty; determining a first quality of displacement between the base position and the first position based on a displacement between the base position and the first position and the associated base uncertainty and the associated first uncertainty; and updating the distance travelled estimate based on a displacement between the base position and the first position in response to the first quality of displacement being greater than a threshold.

In accordance with yet another example implementation, a mobile device may be provided which comprises: a receiver configured to receive signals for position determination; and one or more processing units configured to obtain a base position, the base position having an associated base uncertainty; obtain a first set of signals for position determination from the receiver; determine a first position with the first set of signals, the first position having an associated first uncertainty; determine a first quality of displacement between the base position and the first position based on a displacement between the base position and the first position and the associated base uncertainty and the associated first uncertainty; and update the distance travelled estimate based on a displacement between the base position and the first position in response to the first quality of displacement being greater than a threshold.

In accordance with another example implementation, an apparatus may be provided for use in a mobile device. The apparatus may comprise: means for obtaining a base position for the mobile device, the base position having an associated base uncertainty; means for obtaining a first set of signals for position determination with the mobile device; means for determining a first position of the mobile device with the first set of signals, the first position having an associated first uncertainty; means for determining a first quality of displacement between the base position and the first position based on a displacement between the base position and the first position and the associated base uncertainty and the associated first uncertainty; and means for updating the distance travelled estimate based on a displacement between the base position and the first position in response to the first quality of displacement being greater than a threshold.

In accordance with still another example implementation, an article of manufacturing may be provided which comprises a computer readable medium having stored therein computer executable instructions executable by one or more processing units of a mobile device to: obtain a base position for the mobile device, the base position having an associated base uncertainty; obtain a first set of signals for position determination; determine a first position for the mobile device with the first set of signals, the first position having an associated first uncertainty; determine a first quality of displacement between the base position and the first position based on a displacement between the base position and the first position and the associated base uncertainty and the associated first uncertainty; and update a distance travelled estimate for the mobile device based on a displacement between the base position and the first position in response to the first quality of displacement being greater than a threshold.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
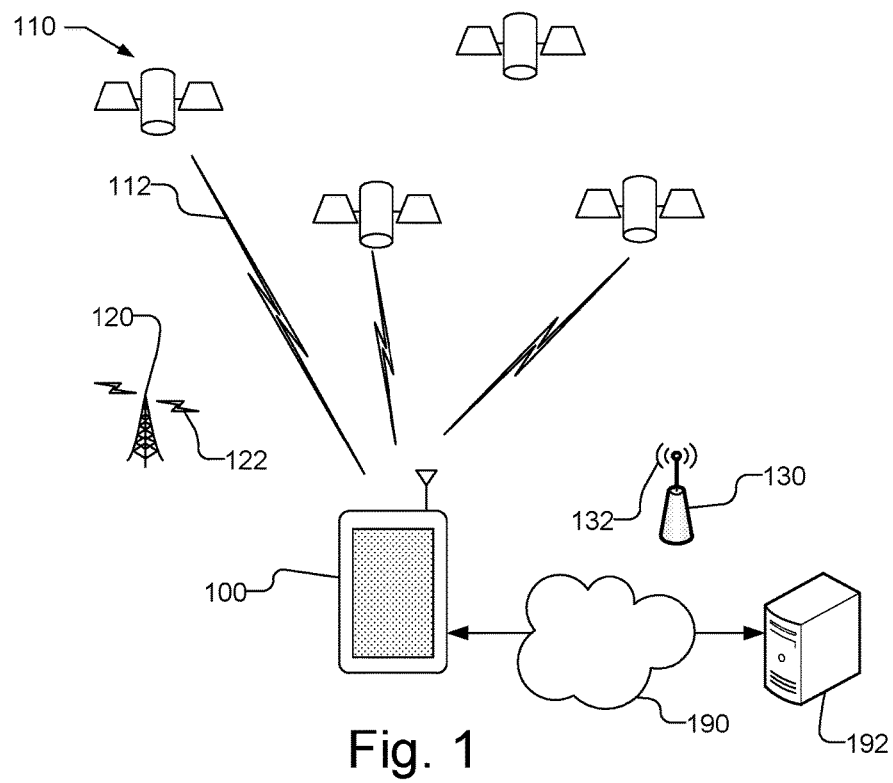
FIG. 1 illustrates a diagram showing a system in which a mobile device obtains location related measurements from which the distance travelled by the mobile device may be estimated.

FIG. 1 illustrates a block diagram showing a system in which a mobile device 100 obtains location related measurements from which the distance travelled by the mobile device 100 may be estimated. In the presently illustrated example, mobile device 100 may have circuitry and processing resources capable of obtaining location related measurements from measurements of signals (112) received from Satellite Positioning System (SPS) satellites 110 and/or signals (such as 122, 132) from terrestrial transmitters fixed at known locations. The position of the mobile device 100 may be determined (estimated) using the location related measurements and the distance traveled by the mobile device 100 may be estimated by creating a recursive history of high likelihood positions and accumulating the distance between them.

In some implementations, location related measurements obtained by mobile device 100 may be transferred through a wireless network 190 to a location server 192, such as an enhanced serving mobile location center (E-SMLC) or SUPL location platform (SLP) after which the location server 192 may estimate or determine a location for mobile device 100 based on the measurements. In the presently illustrated example, location related measurements obtained by the mobile device 100 may include measurements of signals (112) received from Satellite Positioning System (SPS) satellites 110, such as a Global Navigation Satellite System (GNSS) including Global Positioning System (GPS), Galileo, GLONASS or COMPASS or non-global systems, such as QZSS. In some embodiments, the mobile device may obtain location related measurements may additionally or alternatively include measurements of signals (such as 122 and/or 132) received from terrestrial transmitters fixed at known locations (e.g., such as cellular transceiver 120 and/or access point or local transceiver 130, which may be part of the network 190). Mobile device 100 or a separate location server 192 may then obtain a location estimate for mobile device 100 based on these location related measurements using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges or timing differences may be measured at mobile device 100 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at mobile device 100. Mobile device 100 may be capable of receiving positioning assistance data from one or more servers 192, which may include information regarding signals to be measured (e.g., signal timing), locations and identities of terrestrial transmitters and/or signal, timing and orbital information for GNSS satellites to facilitate positioning techniques such as A-GNSS, AFLT, OTDOA and E-CID. For example, server 192 may comprise an almanac which indicates locations and identities of cellular transceivers and/or local transceivers in a particular region or regions such as a particular venue, and may provide information descriptive of signals transmitted by a cellular base station or AP such as transmission power and signal timing. In the case of E-CID, a mobile device 100 may obtain measurements of signal strengths for signals received from cellular transceiver 120 and/or local transceiver 130 and/or may obtain a round trip signal propagation time (RTT) between mobile device 100 and a cellular transceiver 120 or local transceiver 130. A mobile device 100 may use these measurements together with assistance data (e.g. terrestrial almanac data or GNSS satellite data such as GNSS Almanac and/or GNSS Ephemeris information) received from a server 192 to determine a location for mobile device 100 or may transfer the measurements to a server 192 to perform the same determination.

While FIG. 1 illustrates mobile device 100 as a smartphone, the mobile device 100 may be any portable device that is capable of receiving location related measurements. A mobile device (e.g. mobile device 100 in FIG. 1) may be referred to as a device, a wireless device, a mobile terminal, a terminal, a mobile station (MS), a user equipment (UE), a SUPL Enabled Terminal (SET) or by some other name and may correspond to a cellphone, smartphone, laptop, tablet, PDA, tracking device, fitness tracker, activity tracker, or some other portable or moveable device. Typically, though not necessarily, a mobile device may support wireless communication such as using GSM, WCDMA, LTE, CDMA, HRPD, WiFi, BT, WiMax, etc. A mobile device may also support wireless communication using a wireless LAN (WLAN), DSL or packet cable for example. A mobile device may comprise a single entity or may comprise multiple entities such as in a personal area network where a user may employ audio, video and/or data I/O devices and/or body sensors and a separate wireline or wireless modem. An estimate of a location of a mobile device (e.g., mobile device 100) may be referred to as a location, location estimate, location fix, fix, position, position estimate or position fix, and may be geographic, thus providing location coordinates for the mobile device (e.g., latitude and longitude) which may or may not include an altitude component (e.g., height above sea level, height above or depth below ground level, floor level or basement level). Alternatively, a location of a mobile device may be expressed as a civic location (e.g., as a postal address or the designation of some point or small area in a building such as a particular room or floor). A location of a mobile device may also be expressed as an area or volume (defined either geographically or in civic form) within which the mobile device is expected to be located with some probability or confidence level (e.g., 67% or 95%). A location of a mobile device may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

The distance travelled estimate for the mobile device 100 is based on a recursive history of high likelihood positions and accumulating the distance between them. The measured positions of the mobile device used in the distance travelled estimate meet a minimum criteria of usability. The criteria of usability is based on the quality of displacement between relative position measurements, as opposed to the quality of each position measurement itself. The quality of displacement may be determined, for example, based on the displacement between relative position measurements and the uncertainties associated with each of the two position measurements. The uncertainty in position may be described as a covariance matrix, which is a standard method of describing the core properties of the variance/dispersion of errors, or if desired, the uncertainty may be a described in a more complex manner, e.g., where the errors are not well behaved and model-able by a Gaussian distribution. When a new position measurement satisfies the quality of displacement criteria, the distance travelled estimate is updated by accumulating the displacement between the new position and a base position, which is a previous measured position that also satisfied the quality of displacement criteria (or is a starting position for the distance travelled estimate). The accumulated displacement from any intervening positions between the new position and the base position may be excised from the distance travelled estimate in order to avoid permanent accumulation of error introduced by the intervening positions. The use of the quality of displacement criteria is particularly useful, for example, when signals for position determination are obtained in a reduced power mode that yields less accurate position determination relative to a full power mode, or in a low quality signal environment. In a low power mode or low quality signal environment, for example, the mobile device 100 may only infrequently, or never, obtain a suitably high quality position measurement that will not introduce significant errors into the distance travelled estimate.

In some embodiments, the quality of displacement may be used to stratify the position measurements, e.g., into positions with a high quality of displacement, sometimes referred to herein as Tier-1 positions, and positions with usable, but lower quality displacements, sometimes referred to herein as Tier-2 positions. If desired, the position measurements may be stratified into additional tiers, e.g., based on the quality of displacement, as well as other factors such as time, e.g., sometimes referred to herein as Time Tier discussed below. Position measurements that do not qualify as, e.g., the Tier-1 or Tier-2 positions may be excluded from the distance travelled estimation. Tier-2 positions, while having a lower quality displacement than a Tier-1 position, provide responsiveness thereby permitting a relatively frequent update to the distance travelled estimate for the user. Accordingly, when a new measured position qualifies as a Tier-2 position, the distance travelled estimate may be updated by accumulating the displacement between the new Tier-2 position and the preceding Tier-1 position, which serves as a base position. The accumulated displacement from any intervening Tier-2 positions between the new Tier-2 position and the base position may be excised from the distance travelled estimate in order to avoid permanent accumulation of error from the intervening Tier-2 position.

While Tier-2 positions provide responsiveness permitting a more frequent update to the distance travelled estimate for the user, the Tier-1 positions provide accuracy. Accordingly, when a new measured position qualities as a Tier-1 position, the accumulated displacement between any preceding Tier-2 position and the base position is excised, and the distance travelled estimate is updated by accumulating the displacement between the new Tier-1 position and the base position, i.e., the preceding Tier-1 position. Additionally, the base position, which is the preceding Tier-1 position (or the start position) may be replaced by the new Tier-1 position. The history of positions prior to the base position, i.e., the new Tier-1 position, may be excised from memory, as the distance travelled estimation is based on accumulating displacement from the base position. Accordingly, there is no need to carry the indefinite history of all prior position, thereby reducing memory requirements.

In some embodiments, the angle between consecutive segments, i.e., the angle formed by the direction of consecutive displacement vectors, is used to determine if statistically significant deflection occurred so that a prior, i.e., non-Tier-1 position, should be retained in the distance travelled estimate. For example, if a Tier-1 (base) position is followed by a Tier-2 position and then a new Tier-1 position, there are two consecutive segments, i.e., the earliest segment (Tier-1→Tier-2) and the latest segment is (Tier-2→Tier-1). The angle between the two segments may be used to determine if a statistically significant deflection has occurred and the benefit of improved fidelity (tracking a naturally curving line) outweighs the detriment of the increased uncertainty of a Tier-2 point. For example, an angle of zero degrees implies a straight line, while an angle of 180 degrees implies a reversal of the path. If the angle between consecutive segments is less than a deviation threshold, the displacement between a preceding Tier-2 position and the base position is excised from the distance travelled estimate and the distance traveled estimate is updated based on the displacement between the new Tier-1 position and the base position. On the other hand, if the angle between consecutive segments is greater than the deviation threshold, the distance travelled estimate is updated based on the displacement between the new Tier-1 position and the preceding Tier-2 position.

Figure 2:
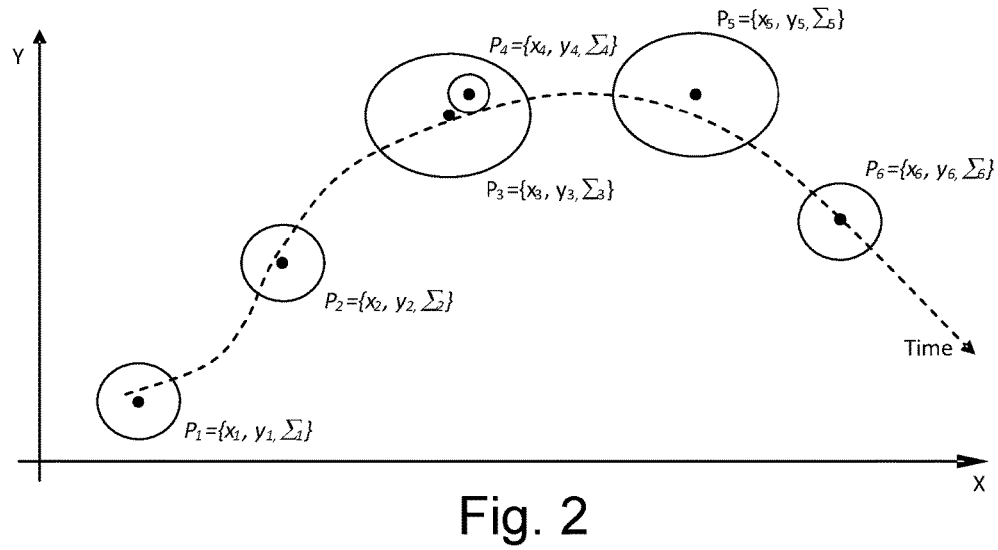
FIG. 2 is a graph illustrating a change in position of a mobile device over time and a 2×2 square matrix representing the uncertainties for determined positions for the mobile device that may be used in a distance travelled estimate.

FIG. 2, by way of example, is a graph illustrating the change in position of a mobile device 100 (shown in FIG. 1) over time. The X and Y axes represent spatial coordinates, and may respectively represent, e.g., East and North, or Horizontal and Vertical. FIG. 2 illustrates several measured positions, $P_1$, $P_2$, $P_3$, $P_4$, $P_5$, and $P_6$, each of which has an x and y coordinate, and an associated 2×2 square matrix uncertainty $\Sigma$, which is illustrated by the relative size of the ellipse. Each measured position additionally has an associated accumulated distance travelled.

Position $P_1$ in FIG. 2 may be a Tier-1 position, based on a quality of displacement determination with respect to a preceding position, not shown in FIG. 2. If there are positions preceding position $P_1$ the accumulated distance travelled associated with position $P_1$ will have a non-zero value. Alternatively, position $P_1$ may be the starting position for the mobile device, in which case, the accumulated distance travelled associated with position $P_1$ will be zero. As the starting position of the mobile device has no preceding positions, a quality of displacement determination is not possible. Accordingly, the starting position may be selected based on the quality of the position, i.e., having an uncertainty that is less than a threshold.

After the mobile device has changed position, as illustrated by the dotted line in FIG. 2, position $P_2$ is the next measured position that satisfies the quality of displacement requirement. The quality of displacement may be determined based on the displacement between the base position $P_1$ and the new position $P_2$ and the uncertainties $\Sigma_1$ and $\Sigma_2$ associated with each of the two positions. For example, the displacement may be relative to the aggregate of the associated uncertainties. In some embodiments, the quality of displacement may be determined as $$\frac{|P_2 - P_1|}{\sqrt{\sigma_{P_2}^2 + \sigma_{P_1}^2}} \qquad \text{eq. 1}$$

where $\sigma$ is a one-dimensional representation of 2×2 square matrix uncertainty $\Sigma$. By way of example, $\sigma$ may be written as:

$$\sigma = \sqrt{\Sigma[1,1] + \Sigma[2,2]} \qquad \text{eq. 2}$$

The determined quality of displacement is compared to a predetermined threshold, and, if greater, position $P_2$ is used to update the distance travelled estimate. Thus, the accumulated distance travelled associated with position $P_2$ is the accumulation of the displacement between $P_2$ and $P_1$ and the accumulated distance travelled associated with position $P_1$, which may be zero if position $P_1$ is the start location, or some non-zero value if position $P_1$ is not the initial position.

In some embodiments, the determined quality of displacement may be compared to two or more predetermined thresholds used to stratify the position measurement. For example, two predetermined thresholds may be used to designate position measurements as a Tier-1 position or a Tier-2 position. By way of example, position $P_2$ may be a Tier-1 position, and as the latest Tier-1 position, position $P_2$ may replace position $P_1$ as the base position.

It should be understood that there may have been position measurements between position $P_1$ and position $P_2$, which did not satisfy the quality of displacement requirement, and accordingly, were not used to update the distance travelled estimate and are not shown in FIG. 2.

Position $P_3$ represents a subsequent position measurement that satisfies the quality of displacement requirement based on the displacement between new position $P_3$ and base position $P_2$ and the uncertainties associated with each of the two positions. The quality of displacement associated with position $P_3$, however, may not be great enough to qualify as a Tier-1 position, and accordingly, position $P_3$ is a Tier-2 position. As a Tier-2 position, the position $P_3$ is used to update the distance travelled estimate based on the displacement between position $P_3$ and the base position $P_2$ and the accumulated distance travelled associated with position $P_2$. However, position $P_3$, as a Tier-2 position, does not replace position $P_2$ as the new base position.

Immediately after acquiring position $P_3$, new position $P_4$ is acquired. The quality of displacement determination of position $P_4$ is based on the displacement between new position $P_4$ and base position $P_2$, which is the latest Tier-1 position, as well as the uncertainties associated with each of the two positions. While position $P_3$ is an immediately preceding position, position $P_3$ is a Tier-2 position, and accordingly, is not used in the determination of the quality of displacement for position $P_4$. The displacement between positions $P_3$ and $P_2$ has already been accumulated in the distance travelled associated with position $P_3$, but to use that displacement would result in absorbing a large proportion of the error in $P_3$. Upon evaluation of $P_4$ and by statistical significance, the displacement between position $P_3$ and the base position $P_2$ is excised and replaced with the displacement between position $P_4$ and base position $P_2$ in the accumulated distance travelled estimate associated with position $P_4$. Moreover, assuming position $P_4$ is a Tier-1 position, position $P_2$ is replaced with position $P_4$ as the base position. Additionally, as position $P_4$ is the latest Tier-1 position and now the base position, the history of positions prior to position $P_4$ may be excised from memory.

Similarly, position $P_5$, which may be a Tier-2 position, may be used to update the distance travelled estimate based on the displacement between position $P_5$ and the base position $P_4$ and the accumulated distance travelled associated with position $P_4$. Further, position $P_6$, which may be a Tier-1 position, may update the distance travelled estimate based on the displacement between position $P_6$ and base position $P_4$ and the accumulated distance travelled associated with position $P_4$. Moreover, position $P_6$ may be set as the new base position and the history of positions prior to position $P_6$ may be excised from memory.

As described, positions $P_1$, $P_2$, $P_4$, and $P_6$ are Tier-1 positions, and positions $P_3$ and $P_5$ are Tier-2 positions. If position $P_4$, however, qualified as a Tier-2 position, the mobile device would traverse from position $P_2$ to position $P_6$ without a Tier-1 position. In this instance, the distance travelled estimate would update for each Tier-2 position based on the displacement with respect to base position $P_2$, the last Tier-1 position. Accordingly, the distance travelled estimate at position $P_6$ will reflect the straight line distance between position $P_6$ and position $P_2$ and will not reflect the dynamics of the actual path illustrated by the dotted line in FIG. 2. Thus, in general, the quality of displacement is used to determine with statistical significance if the increased uncertainty of positions $P_3$, $P_4$ (assuming $P_4$ is a Tier-2 position) and $P_5$ can be justified in consideration of the spatial and temporal separation of positions $P_6$ and $P_2$.

In addition to position uncertainties being a source of error in the distance travelled estimate, the relative direction of travel may be a source of error. For example, a straight line path observes perpendicular position error as an error in the distance travelled, whereas a reversal in direction will observe potentially twice the position error as found at the midpoint. Thus, in some embodiments, the direction of travel may be considered when updating the distance travelled estimate. This example essentially is the counterpart of the previously example. In other words, if the true path is a straight line (not a curve), then generally speaking the distance travelled will be overestimated due the error in the position estimates because the strait line distance is being recreated piece-wise, which will natural be greater than or equal to the true straight line distance.

Figure 3:
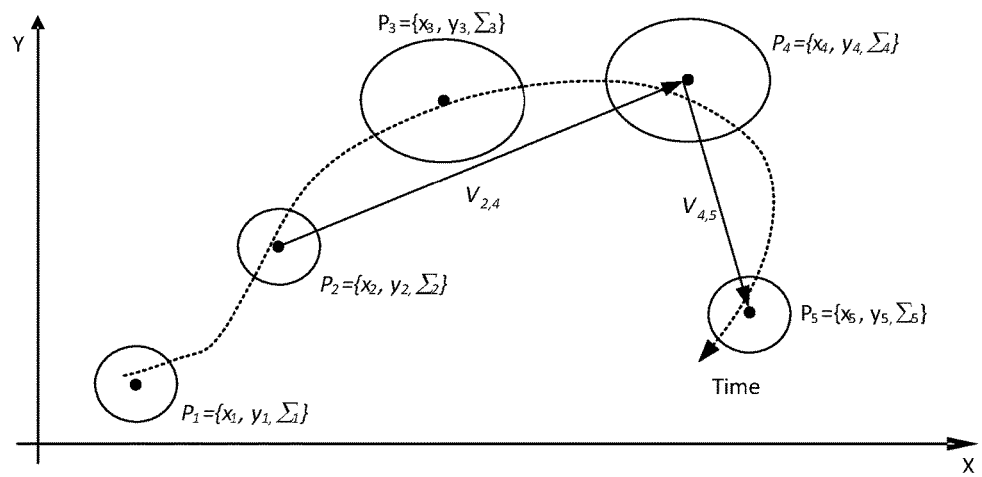
FIG. 3 is a graph similar to that shown in FIG. 2, but additionally illustrates an associated direction of travel for each determined position.

FIG. 3, by way of example, is a graph similar to that shown in FIG. 2, showing several measured positions, $P_1$, $P_2$, $P_3$, $P_4$, and $P_5$ and additionally shows a displacement vector $V_{2,4}$ between positions $P_2$, $P_4$ and a displacement vector $V_{4,5}$ between positions $P_4$, $P_5$. The path of travel, illustrated in FIG. 3 as the dotted line, is similar to that shown in FIG. 2, except that a significant change in direction occurs between positions $P_4$ and $P_5$, which is evident by the direction of the dotted line at the instants of $P_4$ and $P_5$.

If a reliable estimate of the instantaneous heading is available, that can serve at the preferred means of detecting a large change in heading between $P_4$ and $P_5$. However, given the suitability of this method to operate in environments with limited ability to measure that instantaneous heading, we can instead use as a substitute the displacement vectors associated with positions $P_2$, $P_4$ and positions $P_4$, $P_5$, and using this it may be determined whether a significant deflection has occurred. The deflection between consecutive segments, e.g., the angle between displacement vectors, may be compared to a deviation threshold to determine if there is a deviation in direction. If a deviation in direction is present, the displacement associated with the preceding position is not excised from the distance travelled estimate. Thus, for example, in FIG. 3, position $P_2$ is the base position, positions $P_3$ and $P_4$ are Tier-2 positions, and position $P_5$ is another Tier-1 position. As discussed above, when position $P_4$ is obtained, the displacement contribution from the preceding Tier-2 position $P_3$ is excised from the distance travelled estimate. When the new Tier 1 position $P_5$ is obtained, the $V_{4,5}$ vector is already calculated (as it was used to evaluate the quality of the displacement). The $V_{2,4}$ vector, which was previously calculated when accepting $P_4$ as the most recent Tier-2 point may be stored in memory or may be recalculated based on having both positions $P_2$ and $P_4$ in memory (note that position $P_2$ (the last Tier-1 point) is still in memory because we the process of accepting position $P_5$ as the most recent Tier-1 point has not yet occurred). The angle between the two displacement vectors $V_{2,4}$ and $V_{4,5}$ is calculated and compared to the deviation threshold. The deviation threshold may be determined empirically to balance the fidelity (tracking a naturally curving line) with respect to the detriment of the increased uncertainty of a Tier-2 point. By way of example, the deviation threshold may be 30 degrees, but other deviation thresholds may be used if desired, noting that there is a tradeoff between the criteria on the linear displacement and the angular deflection, i.e., the longer the segments, the more confidently the smaller angular deflections may be detected. If the angle between the two displacement vectors is greater than the deviation threshold, the displacement between base position $P_2$ and Tier-2 position $P_4$ is not excised from the distance travelled estimate, but instead is included along with the displacement between positions $P_4$ and $P_5$. Moreover, as position $P_5$ is a Tier-1 position, the position $P_5$ is set as the new base position and the position history prior to position $P_5$ may be excised from memory if desired.

Figure 4:
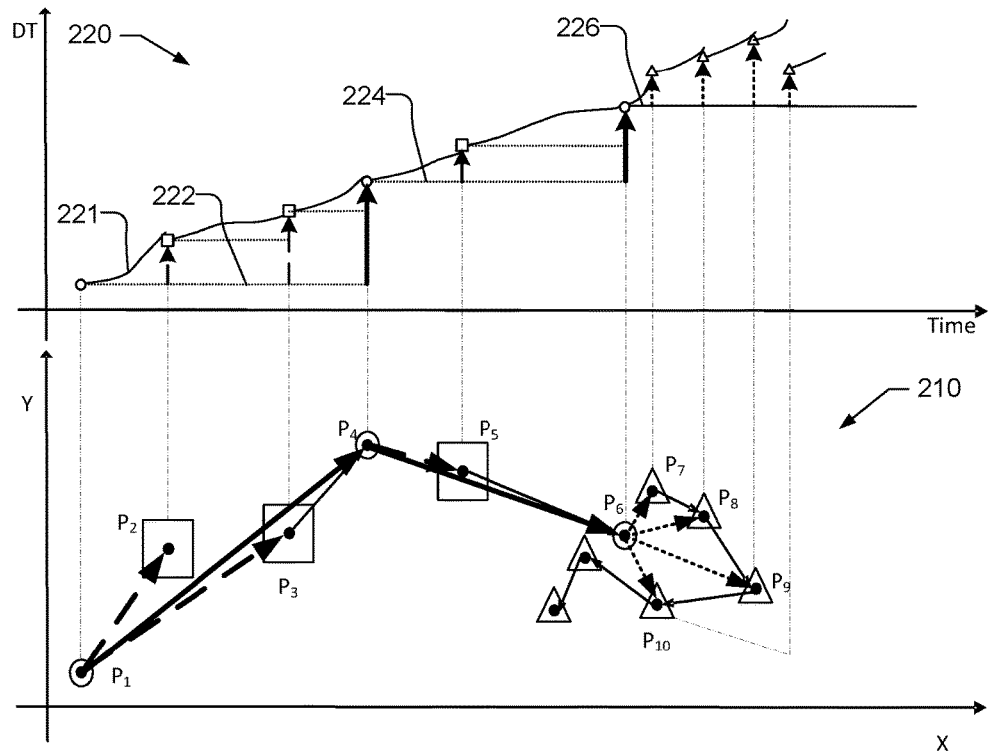
FIG. 4 shows two aligned graphs illustrating the change in position of a mobile device over time and a distance travelled estimate for the mobile device with respect to time.

FIG. 4 shows two aligned graphs 210 and 220 respectively illustrating the change in position of a mobile device 100 (shown in FIG. 1) along the X and Y axes representing spatial coordinates, and the distance travelled estimate (DT) with respect to time. The X and Y axes of graph 210 represent spatial coordinates, and may respectively represent, e.g., East and North, or Horizontal and Vertical. It should be understood that the time axis of graph 220 is not necessarily linear and is illustrated as being roughly equivalent to the X axis of graph 210 for analogy. Graphs 210 and 220 illustrates multiple tiers, e.g., with Tier-1 positions illustrated with a circle, Tier-2 positions illustrated with a square, and a Time-Tier position, discussed in detail below, illustrated with a triangle.

As illustrated in graph 210, the starting position is position $P_1$, which is a Tier-1 position, and the next usable measured position is position $P_2$, which is a Tier-2 position. Referring to graph 220, the position $P_1$ serves as the base position for the distance travelled estimate, as illustrated by dotted line 222. If desired, the distance travelled estimate may be continuously (or nearly continuously) updated from the last measured position, e.g., using a conventional free running accumulator that may be use a heuristic of velocity and displacement (with some influence of static detection), as illustrated by the solid line 221. The distance travelled estimate provided with a conventional free running accumulators, however, is not necessary for the present invention, but may be used to provide a user with a continuous, or more prompt, rough estimate of the distance travelled between position measurements that satisfy the quality of displacement criteria. By way of example, a free running accumulator may be integrate each instantaneous velocity over the delta time, or may simply accumulate each delta position without an assessment of quality. In another example, a free running accumulator may be a pedometer. As illustrated in graph 220, when position $P_2$ is obtained, the distance travelled estimate is updated based on the Euclidian distance between position $P_1$ and position $P_2$. As further illustrated in graphs 210 and 220, when the next usable measured position is obtained, i.e., position $P_3$, which is a Tier-2 position, the distance travelled estimate is again updated based on the Euclidian distance between position $P_1$ (the base position) and position $P_3$.

When a subsequent Tier-1 position is obtained, i.e., position 4, the distance travelled estimate is again updated based on the Euclidian distance between position $P_1$ (the base position) and position $P_4$, and position $P_4$ replaces position $P_1$ as the base position, as illustrated by dotted line 224. Once a Tier-1 position is obtained, it is determined whether there is a significant deviation in direction between the last two consecutive segments, i.e., the angle between displacement vector between the base position and the preceding Tier-2 position and the displacement vector between the preceding Tier-2 position and the new Tier-1 position. If there is a significant deviation in direction, the displacement between the base position and the preceding Tier-2 position is not excised from the distance travelled estimate.

The process continues with the distance travelled estimate updated based on the Euclidian distance between position the Tier-2 position $P_5$ with respect to the base position $P_4$, and the following Tier-1 position $P_6$ with respect to the base position $P_4$, and position $P_6$ becomes the new base position, as illustrated by line 226. If desired, between the updates based on Tier-1 or Tier-2 points, the distance travelled estimate may be updated as illustrated by the solid but discontinuous line 221, which may be produced by a free running accumulator that is reset when a Tier-1 or Tier-2 position is obtained. It should be understood that line 221 refers to the entire solid but discontinuous line and not only the line segment between positions $P_1$ to $P_2$.

In the present example, at position $P_6$, the mobile device becomes stationary. In some embodiments, such as when in full power mode which produces accurate position measurements, it may be determined that the mobile device is static and, accordingly, the distanced travelled estimate may accumulate no further distance until the mobile device is moving again. In some embodiments, however, such as when in a low power mode with less accurate positioning, it may not be possible to determine that the mobile device is static. Accordingly, periodic measurement positions that do not satisfy the quality of displacement criteria may be used to update the distance travelled estimate with respect to the last Tier-1 or Tier-2 position. Measurement positions that are periodically obtained, e.g., every 10 seconds, but that do not satisfy the quality of displacement criteria are designated as Time Tier (Tier-T) positions. Graph 210 illustrates positions $P_7$, $P_8$, $P_9$, and $P_{10}$ as Tier-T positions. As illustrated in graph 220, the Tier-T positions update the distance travelled estimate with respect to the last Tier-1 or Tier-2 position, whichever is the most recent, thereby bounding the accumulated error in the distance travelled estimate produced by the free running accumulator, illustrated by line 221, while allowing for meaningful reductions in the error in the distance travelled estimate as illustrated at position $P_{10}$. Once another Tier-1 or Tier-2 position is obtained, e.g., if the mobile device begins to move again, the distance travelled estimate will be increased relative to the last Tier-1 position, e.g., position $P_6$.

It should be understood that Time Tier positions may be obtained periodically throughout the distance travelled estimate process, and not solely when the mobile device is static. FIG. 4 illustrates the Tier-T positions, $P_7$, $P_8$, $P_9$, and $P_{10}$, with respect to a static position $P_6$ merely for illustration. Tier-T positions may be obtained periodically between positions $P_1$ and position $P_6$ as well. Thus, Tier-T positions may be used to bound the accumulated error in the distance travelled estimate produced by the free running accumulator, illustrated by line 221, after any Tier-1 or Tier-2 position is obtained. For example, Time Tier positions may be obtained and used to bound the accumulated error in the distance travelled estimate after position $P_5$, was obtained, until the Tier-1 position $P_6$ was obtained and position $P_6$ becomes the new base position.

Figure 5:
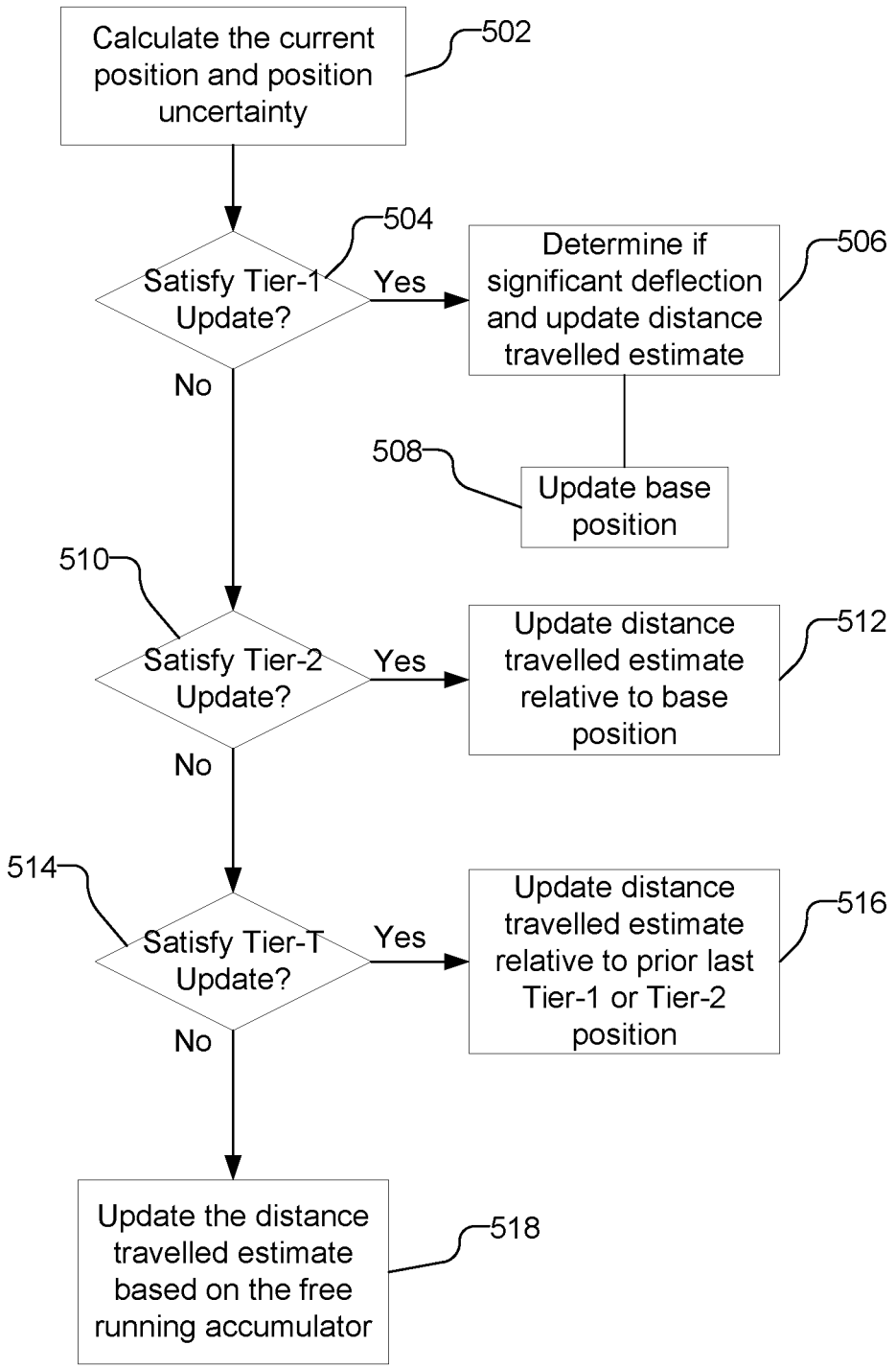
FIG. 5 is a flow chart illustrating a process of updating the distance travelled estimate using multiple tiers.

FIG. 5, by way of example, illustrates a flow chart illustrating a process of updating the distance travelled estimate using multiple tiers. As illustrated, a current position and position uncertainty is calculated (502). The position and position uncertainty may be conventionally calculated, e.g., using signals received from SPS satellites 110 and/or terrestrial transmitters 120, 130 (shown in FIG. 1). It is then determined if the current position satisfies the Tier-1 update (504). For example, as discussed, it is determined if the quality of displacement for the current position is greater than a Tier 1 threshold. If current position satisfies the Tier-1 update criteria, it is determined if there is a significant deflection, as discussed above, and the distance travelled estimate is updated, e.g., relative to the base position if no significant deflection occurred or relative to a previous Tier-2 position if significant deflection has occurred (506). Additionally, the base position is updated to be the current position (508).

If the current position does not satisfy the Tier-1 update (504), it is determined if the current position satisfies the Tier-2 update (510), e.g., the quality of displacement for the current position is greater than a Tier 2 threshold. If the current position satisfies the Tier-2 update criteria, the distance travelled estimate is updated relative to the base position (512).

If the current position does not satisfy the Tier-2 update (510), it is determined if the current position satisfies the Tier-T update criteria (514), e.g., whether it has been the designated amount of time since the last Tier-T update. If the current position satisfies the Tier-T update criteria, the distance travelled estimate is updated relative to the prior Tier-1 or Tier-2 position, whichever is the latest reference position for the accumulation (516). Otherwise, the distance travelled estimate is updated based on the free running accumulator (518). It should be understood that the distance travelled estimate may be updated based on the free running accumulator (if used) in a continuous or semi-continuous manner, e.g., between positions calculated in 502.

Figure 6:
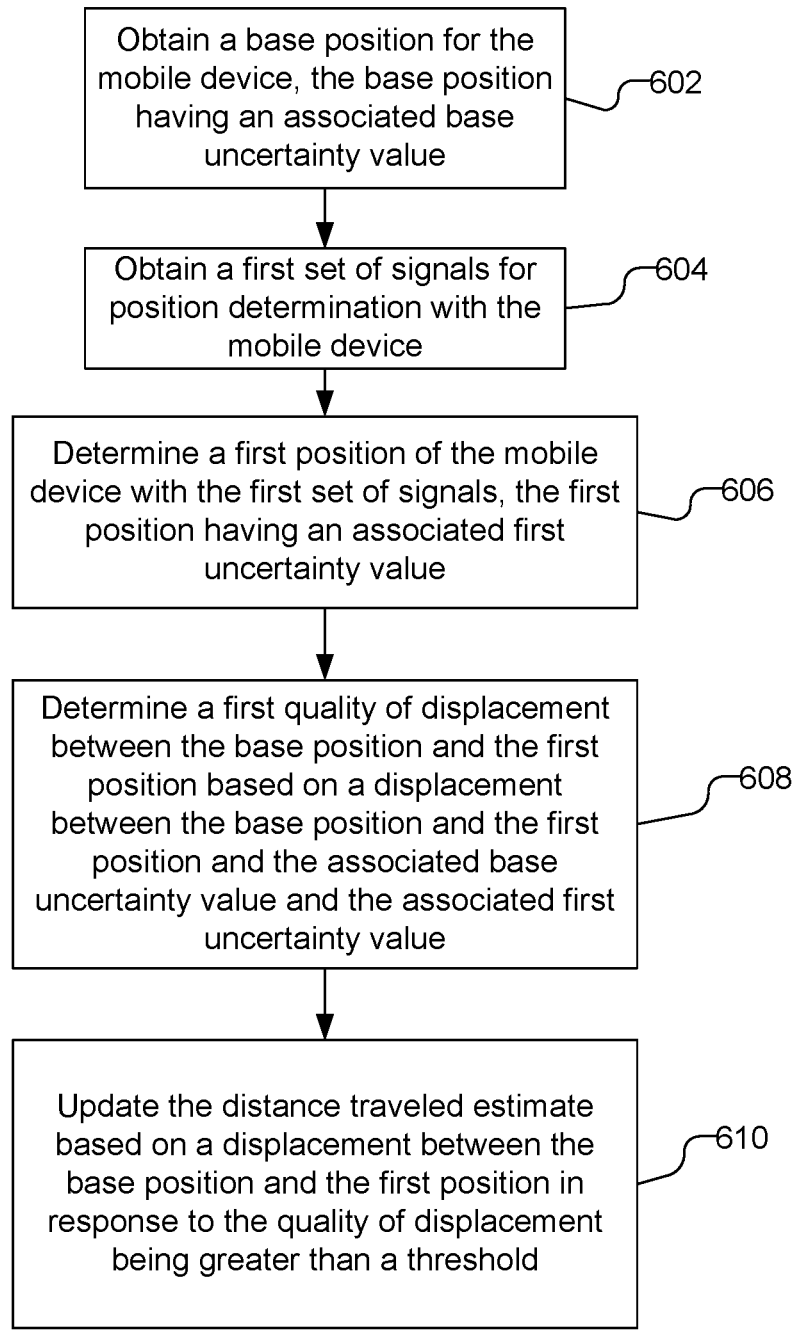
FIG. 6 is a flow chart illustrating a method of performing a distance travelled estimate for the mobile device using a quality of displacement determination.

FIG. 6 is a flow chart illustrating a method of performing a distance travelled estimate for a mobile device 100, shown in FIG. 1. The distance travelled estimate may be performed by the mobile device 100 and/or server 192. As illustrated, a base position for the mobile device is obtained, where the base position has an associated base uncertainty (602). The base position may be obtained by obtaining an initial set of signals for position determination, e.g., from SPS satellites 110 and/or terrestrial transmitters 120, 130 (shown in FIG. 1) and determining the base position for the mobile device 100 with the initial set of signals. By way of example, the base position may be a Tier-1 position that was previously determined or may be a starting position for the mobile device 100 and may be obtained based on the uncertainty. The first set of signals for position determination may be obtained by the mobile device in a reduced power mode that yields less accurate position determination relative to a full power mode.

A first set of signals for position determination are obtained with the mobile device 100 (604), e.g., from SPS satellites 110 and/or terrestrial transmitters 120, 130 (shown in FIG. 1). A first position of the mobile device 100 is determined with the first set of signals, where the first position has an associated first uncertainty (606).

A first quality of displacement between the base position and the first position is determined based on a displacement between the base position and the first position and the associated base uncertainty and the associated first uncertainty (608). For example, the first quality of displacement between the base position and the first position may be based on the displacement between the base position and the first position relative to an aggregate of the associated base uncertainty and the associated first uncertainty, such as illustrated in equation 1, above.

Figure 7:
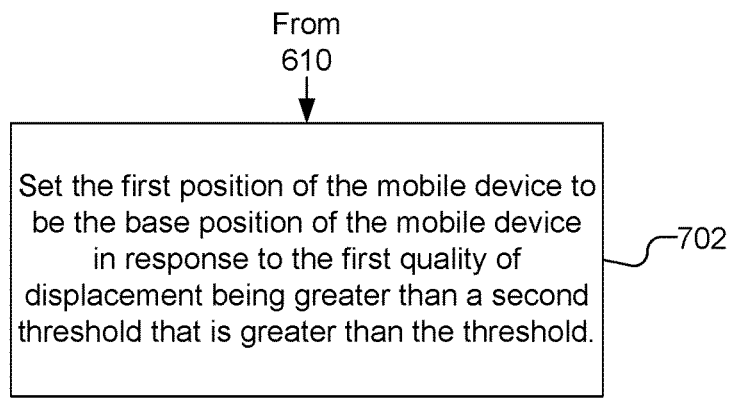
FIG. 7 is a flow chart illustrating a process of setting the base position while performing a distance travelled estimate for the mobile device that is in addition to that shown in FIG. 6.

The distance traveled estimate is updated based on a displacement between the base position and the first position in response to the quality of displacement being greater than a threshold (610). The threshold, for example may be either a Tier-1 threshold or a Tier-2 threshold. Additionally, as discussed above, and as illustrated in FIG. 7, the first position of the mobile device 100 may be set as the base position in response to the first quality of displacement being greater than the threshold, e.g., when the threshold is a Tier-1 threshold (702).

Figure 8:
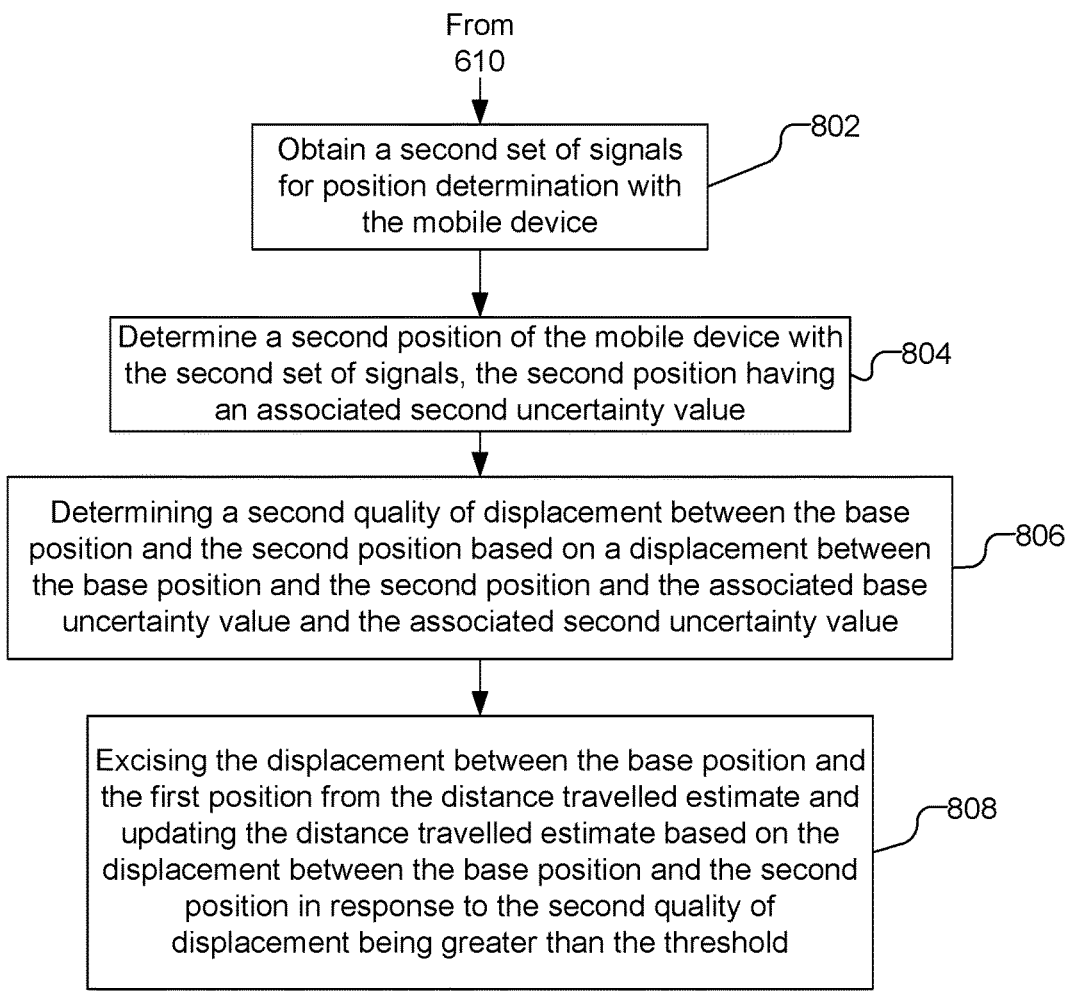
FIG. 8 is a flow chart illustrating an additional method of excising previous displacements from the distance travelled estimate for the mobile device that is in addition to that shown in FIG. 6.

FIG. 8 is a flow chart illustrating an additional method continued from 610 in FIG. 6, to perform a distance travelled estimate for the mobile device 100. As illustrated, a second set of signals for position determination is obtained with the mobile device 100 (802) and a second position of the mobile device is determined with the second set of signals, where the second position has an associated second uncertainty (804). A second quality of displacement between the base position and the second position is determined based on a displacement between the base position and the second position and the associated base uncertainty and the associated second uncertainty (806). The displacement between the base position and the first position is excised from the distance travelled estimate and the distance travelled estimate is updated based on the displacement between the base position and the second position in response to the second quality of displacement being greater than the threshold (808), e.g., where the threshold is a Tier-2 threshold as discussed above.

Figure 9:
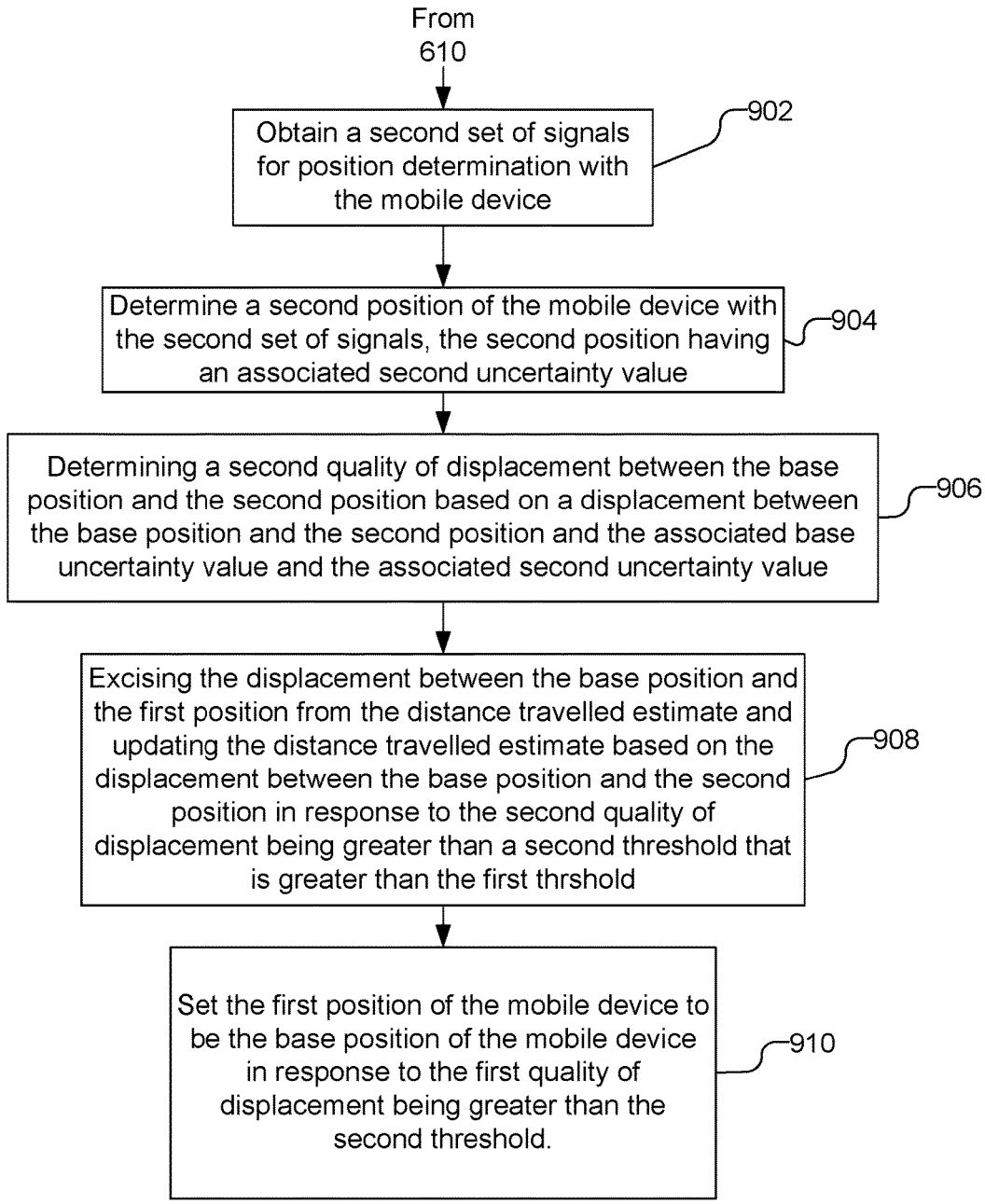
FIG. 9 is a flow chart illustrating an additional method of excising previous displacements from the distance travelled estimate for the mobile device that is in addition to that shown in FIG. 6.

FIG. 9 is a flow chart illustrating an additional method continued from 610 in FIG. 6, to perform a distance travelled estimate for the mobile device 100. As illustrated, a second set of signals for position determination is obtained with the mobile device 100 (902) and a second position of the mobile device is determined with the second set of signals, where the second position has an associated second uncertainty (904). A second quality of displacement between the base position and the second position is determined based on a displacement between the base position and the second position and the associated base uncertainty and the associated second uncertainty (906). The displacement between the base position and the first position is excised from the distance travelled estimate and the distance travelled estimate is updated based on the displacement between the base position and the second position in response to the second quality of displacement being greater than a second threshold that is greater than the threshold (908), e.g., where the threshold is a Tier-2 threshold and the second threshold is a Tier-1 threshold, as discussed above. The second position of the mobile device is set as the base position of the mobile device in response to the second quality of displacement being greater than the second threshold (910).

Figure 10:
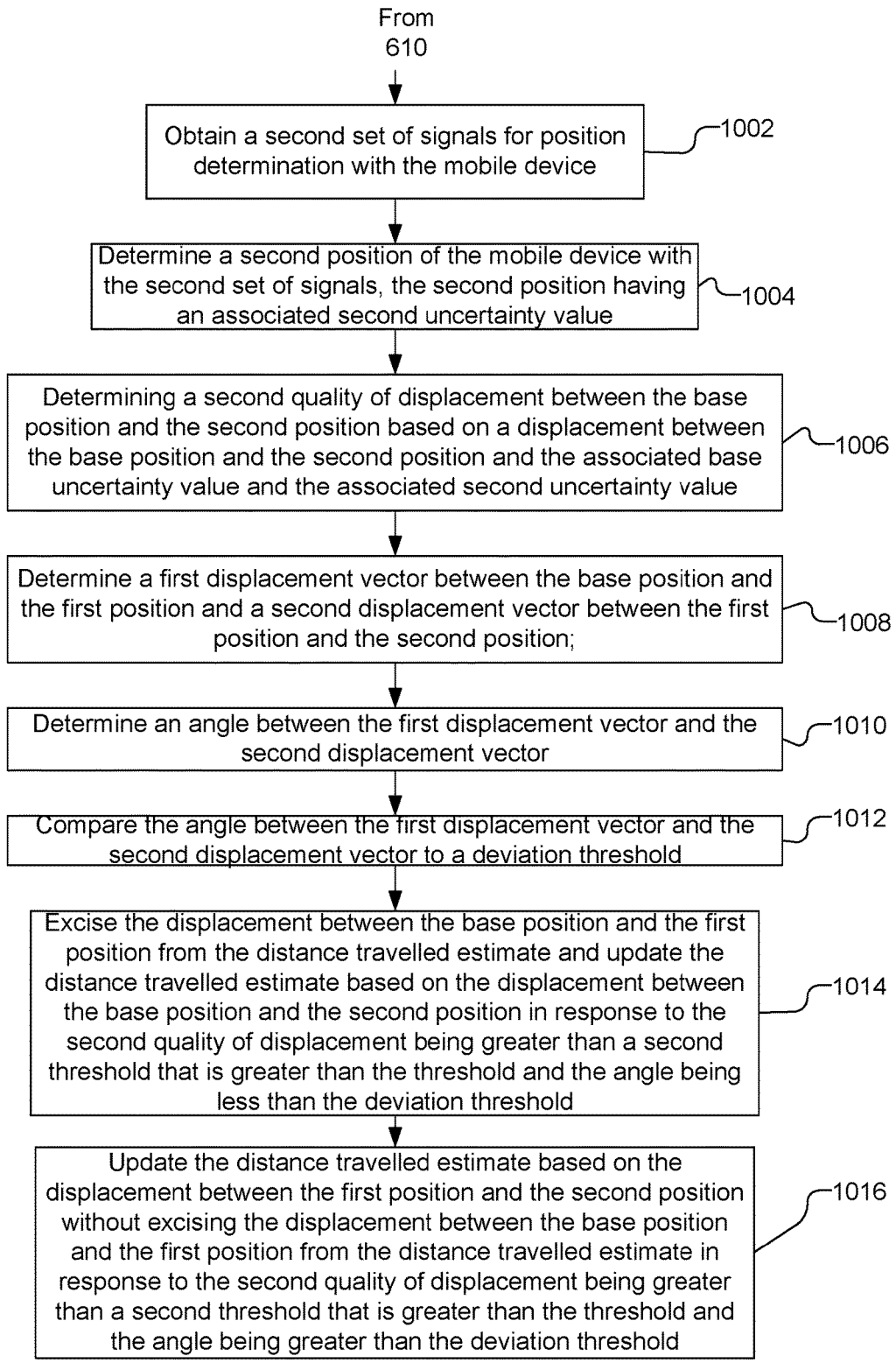
FIG. 10 is a flow chart illustrating an additional method of using a deviation in direction during the distance travelled estimate for the mobile device that is in addition to that shown in FIG. 6.

FIG. 10 is a flow chart illustrating an additional method continued from 610 in FIG. 6, to perform a distance travelled estimate for the mobile device 100. As illustrated, a second set of signals for position determination is obtained with the mobile device 100 (1002) and a second position of the mobile device is determined with the second set of signals, where the second position has an associated second uncertainty (1004). A second quality of displacement between the base position and the second position is determined based on a displacement between the base position and the second position and the associated base uncertainty and the associated second uncertainty (1006). A first displacement vector is determined between the base position and the first position and a second displacement vector is determined between the first position and the second position (1008). The angle between the first displacement vector and the second displacement vector is determined (1010) and this angle is compared to a deviation threshold (1012). If the angle is less than the deviation threshold, the displacement between the base position and the first position is excised from the distance travelled estimate and the distance travelled estimate is updated based on the displacement between the base position and the second position in response to the second quality of displacement being greater than a second threshold that is greater than the threshold (1014), e.g., where the threshold is a Tier-2 threshold and the second threshold is a Tier-1 threshold, as discussed above. On the other hand, if the angle is greater than the deviation threshold, the distance travelled estimate is updated based on the displacement between the first position and the second position without excising the displacement between the base position and the first position from the distance travelled estimate in response to the second quality of displacement being greater than a second threshold that is greater than the threshold (1016), e.g., where the threshold is a Tier-2 threshold and the second threshold is a Tier-1 threshold, as discussed above.

Figure 11:
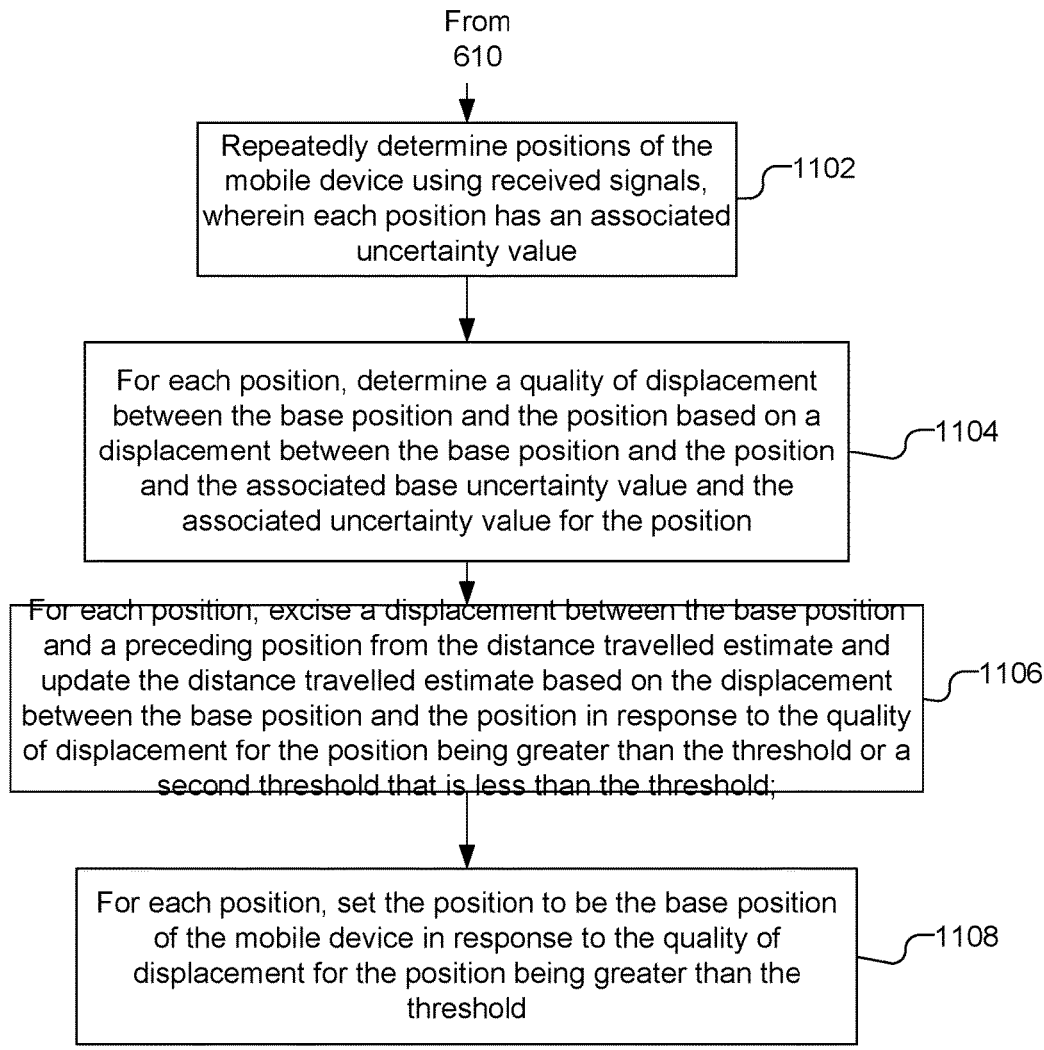
FIG. 11 is a flow chart illustrating an additional method of determining the distance travelled estimate for the mobile device that is in addition to that shown in FIG. 6.

FIG. 11 is a flow chart illustrating an additional method continued from 610 in FIG. 6, to perform a distance travelled estimate for the mobile device 100. As illustrated, positions of the mobile device are repeatedly determined using received signals, wherein each new position has an associated uncertainty (1102). For each position, a quality of displacement between the base position and the new position is determined based on a displacement between the base position and the new position and the associated base uncertainty and the associated uncertainty for the new position (1104). For each new position, a displacement between the base position and a preceding position is excised from the distance travelled estimate and the distance travelled estimate is updated based on the displacement between the base position and the new position in response to the quality of displacement for the new position being greater than the threshold or a second threshold that is less than the threshold (1106), e.g., where the threshold is a Tier-1 threshold and the second threshold is a Tier-2 threshold. Moreover, for each new position, the new position is set to be the base position of the mobile device in response to the quality of displacement for the position being greater than the threshold (1108), e.g., where the threshold is a Tier-1 threshold.

Figure 12:
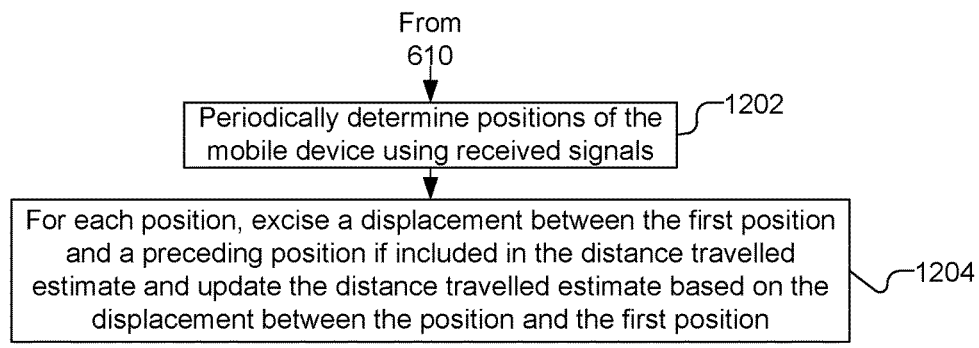
FIG. 12 is a flow chart illustrating an additional method of using a time tier during the distance travelled estimate for the mobile device that is in addition to that shown in FIG. 6.

FIG. 12 is a flow chart illustrating an additional method continued from 610 in FIG. 6, to perform a distance travelled estimate for the mobile device 100. As illustrated, positions are periodically determined for the mobile device using received signals (1202). For each new position, a displacement between the first position and a preceding position is excised if included in the distance travelled estimate and the distance travelled estimate is updated based on the displacement between the new position and the first position (1204).

Thus, the process of distance travelled estimation, as described herein, is robust for a static platform, e.g., through the use of a Time Tier; is robust to sparse/irregular measurements, due to the use of quality of displacement criteria; may be extended to include additional tiers as is allowable by memory and computational cycles; and may additionally incorporate an independent distance travelled estimate (e.g. a pedometer), as illustrated by line 221 in FIG. 4. Moreover, the process of distance travelled estimation, as described herein, permits a two-way calibration in which the distance travelled estimator of the mobile device may be calibrated with respect to an external source, or vice versa. Further, the process of distance travelled estimation facilitates common features of fitness trackers, such as lap times, resets, etc., for example, via a user interface and saving or resetting distance travelled estimates.

Figure 13:
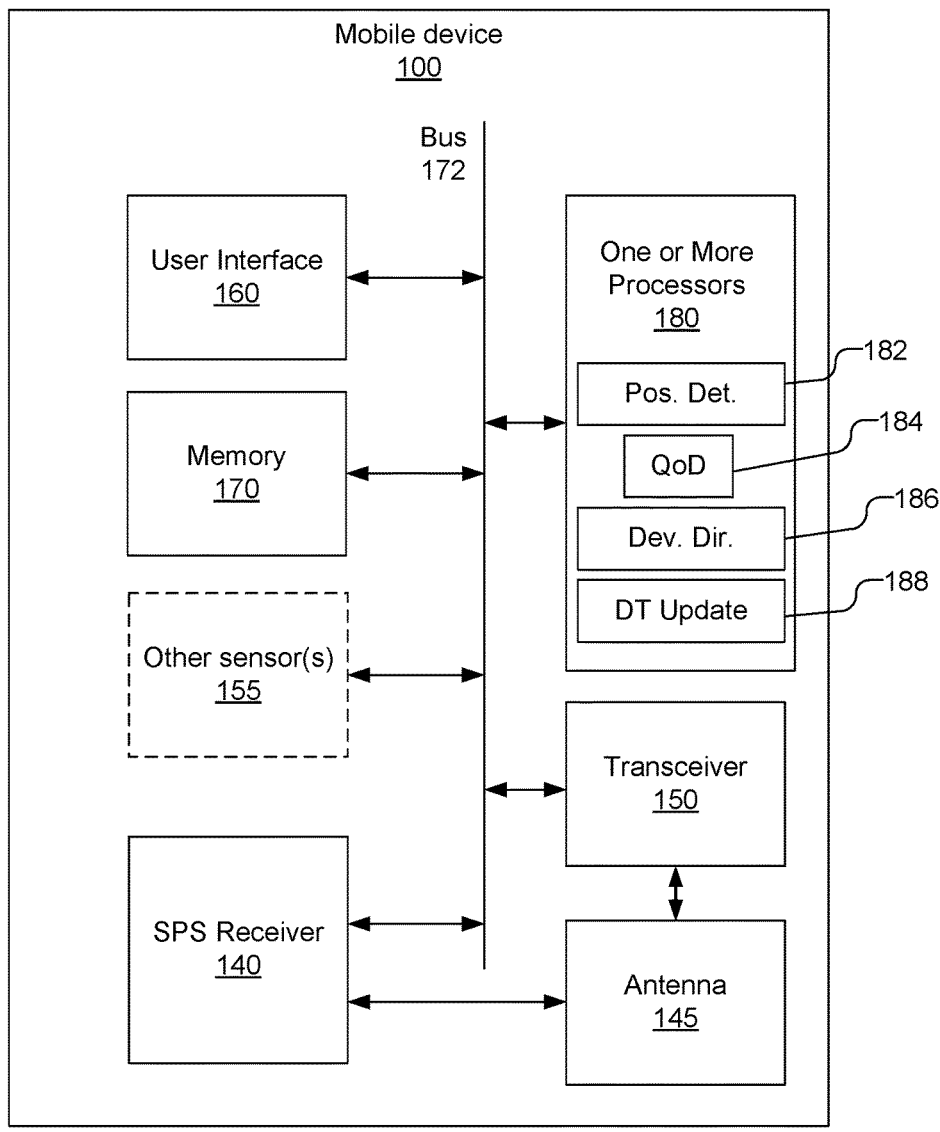
FIG. 13 is a block diagram of a mobile device capable of performing a distance travelled estimate as described herein.

FIG. 13 is a block diagram of a mobile device 100 capable of performing a distance travelled estimate as described herein. The mobile device 100 includes an SPS receiver 140 and antenna 145 that may be used to receive SPS signals from SPS satellites 110 (shown in FIG. 1). Mobile device 100 may further include one or more transceivers 150, which may also be used with antenna 145 (or a different antenna) to wirelessly communicate with terrestrial transmitters, such as cellular transceiver 120 and/or local transceiver 130 (shown in FIG. 1). The mobile device 100 may include other sensor(s) 155, such as accelerometers, gyroscopes, electronic compass, magnetometer, barometer, etc., which may assist distance travelled estimation, e.g., using a free running accumulator. The mobile device 100 may further include a user interface 160 that may include e.g., a display to display to a user the updated distance travelled estimate, as well as a keypad or other input device, such as virtual keypad on the display, through which the user can input information and/or instructions, such as start, stop and reset of the distance travelled estimate, to the mobile device 100.

The mobile device 100 further includes a memory 170 and one or more processors 180, which may be coupled together with bus 172. The processor 180 and other components of the mobile device 100 may similarly be coupled together with bus 172, a separate bus, or may be directly connected together or a combination of the foregoing. The memory 170 may contain executable code or software instructions that when executed by the one or more processors 180 to perform the methods described herein.

As illustrated in FIG. 13, the one or more processors 180 may include one or more processing units or components that implement the methodologies as described herein. For example, the one or more processors 180 may include a position determination processing unit (Pos. Det. 182), which is configured to obtain a set of signals for position determination from the SPS receiver 140 and/or the receiver in the transceiver 150 and to determine a position of the mobile device 100, which has an associated uncertainty, based on the set of signals for position determination. The Pos. Det. 182 processing unit may be configured to determine the position of the mobile device 100 using the received set of signals or may configured to forward the received set of signals to a separate location server 192 (shown in FIG. 1) and in response, receiving the determined position of the mobile device 100, e.g., using transceiver 150. As discussed above, the position of the mobile device 100 may be determined using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges or timing differences may be measured at mobile device 100 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at mobile device 100. Moreover, the distance travelled estimate that is to be determined is based on the position and position uncertainty, not on a particular minimum number of measurements. The position and position uncertainty may be determined using a reduced set of measurements, although the uncertainty may grow quickly. For example, the clock used in the receiver is relatively stable, and therefore over a few seconds the time error will not grow very quickly. Consequently, the distance travelled estimate may be based on positions determined using, e.g., three satellites (depending on signal strength, geometry, etc.).

The one or more processors 180 may further include a quality of displacement processing unit (QoD 184), which is configured to determine a quality of displacement between a base position and a newly determined position as discussed herein. The QoD 184 processing unit may determine the quality of displacement, for example, by determining the displacement between the base position and the new position and determining an aggregate of the uncertainties associated with each of the two positions. The quality of displacement may then be determined based on the determined displacement and aggregate of the associated uncertainties, e.g., as shown in equation 1, above.

The one or more processors 180 may further include a deviation in direction processing unit (Dev. Dir. 186), which is configured to determine the deviation in direction between two positions as discussed herein. The Dev. Dir. 184 processing unit may determine a deviation in direction, for example, by obtaining the direction of travel of each position, which may be determined by the Pos. Det. 182 processing unit, and determining the absolute value of the difference between the directions of travel.

The one or more processors 180 may further include a distance travelled update processing unit (DT Update 188), which is configured to update the distance travelled estimate based on the quality of displacement and the deviation in direction, if used. The updated distance travelled may be, for example, displayed on the user interface 160 and/or transmitted via transceiver 150 to a remote server 192 (shown in FIG. 1). The DT Update 188 processing unit may be configured to update the distance travelled by comparing the quality of displacement from QoD 184 processing unit to one or more thresholds. If the quality of displacement exceeds a threshold, the DT Update 188 processing unit updates the distance travelled estimate based on the determined displacement between the base position and the new position. Moreover, the DT Update 188 processing unit may be configured to excise from the distance travelled estimate the displacement between the base position and a preceding position if the quality of displacement exceeds a threshold. If more than one threshold is used, the DT Update 188 processing unit may designate the new position as, e.g., a Tier 1 position if the quality of displacement exceeds a Tier 1 threshold, or a Tier 2 position if the quality of displacement exceeds a Tier 2 threshold. If the new position is a Tier 1 position, for example, DT Update 188 processing unit sets the new position as the base position. Additionally, if Dev. Dir. 186 processing unit is used, the DT Update 188 processing unit may be configured to compare the deviation in direction to a deviation threshold and if greater than the deviation threshold (and the quality of displacement greater than a threshold), the DT Update 188 processing unit determines the displacement between the new position and a previous position that is not necessarily the base position and updates the distance travelled estimate accordingly, and sets the new position to be the base position. The DT Update 188 processing unit may also be configured to use a Time Tier, where for each new periodically determined position a displacement based on a preceding position is excised from the distance travelled estimate and the distance travelled estimate is updated using the displacement between each new position and a previous position, e.g., Tier 1 or Tier 2 position.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 170, and are configured to cause the one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Figure 14:
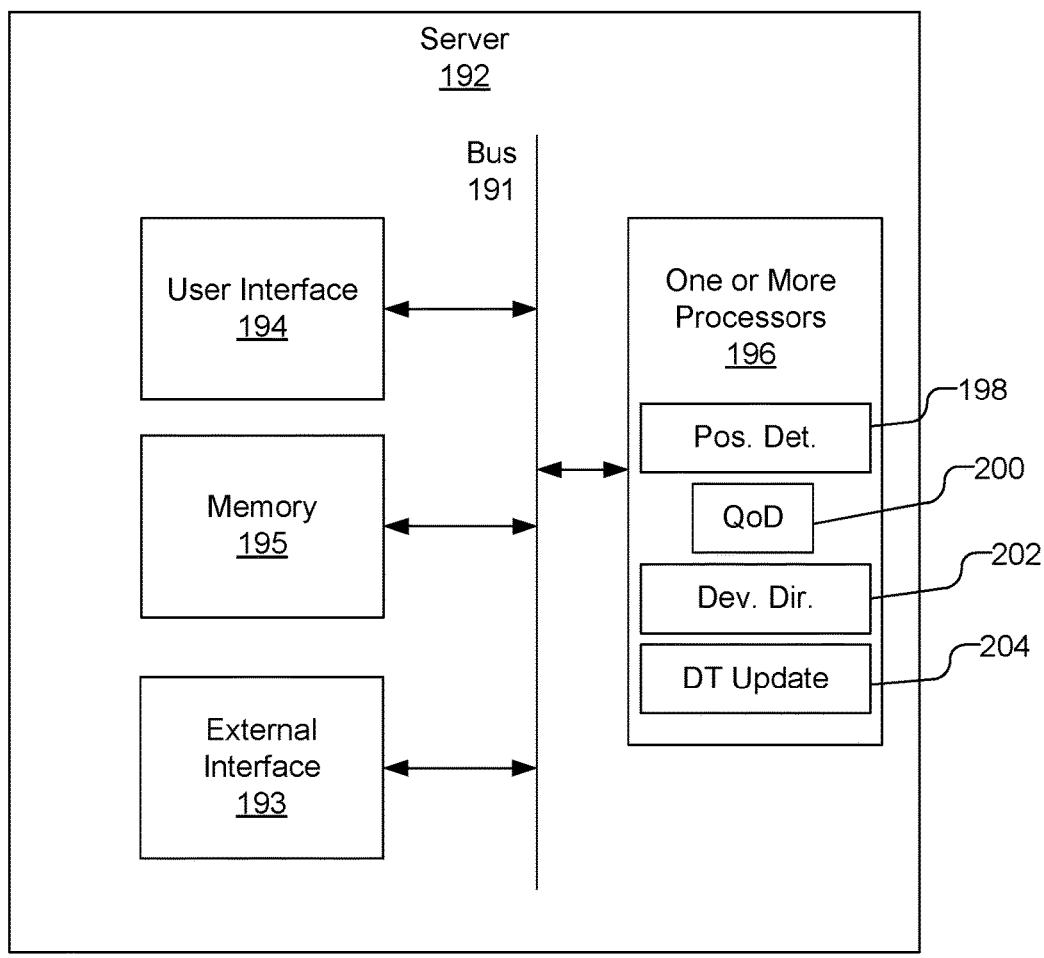
FIG. 14 is a block diagram of a server capable of performing a distance travelled estimate for the mobile device as described herein.

FIG. 14 is a block diagram of a server 192 capable of performing a distance travelled estimate for the mobile device 100 as described herein. The server 192 includes an external interface 193 that is capable of communicating with the mobile device 100, e.g., through the wireless network 190 shown in FIG. 1. The server 192, for example, may use the external interface 193 to obtain the signals for position determination from the mobile device 100 or, alternatively, the mobile device 100 may determine its own position and the server 192 may use the external interface 193 to obtain the position and associated uncertainty from the mobile device 100. The external interface 193 may also be capable of transmitting data to the mobile device 100, such as assistance data or the distance travelled estimate. The server 192 may further include a user interface 194 that may include e.g., a display, as well as a keypad or other input device through which the user can input information into the server 192. The external interface 193 may include one or more separate interface devices. For example, the external interface 193 may include a wired interface that is coupled to a router (not shown) and/or a wireless interface that may support wireless communication such as using GSM, WCDMA, LTE, CDMA, HRPD, WiFi, BT, WiMax, etc., or wireless communication using a wireless LAN (WLAN), DSL or packet cable, for example.

The server 192 further includes a memory 195 and one or more processors 196, which may be coupled together with bus 191. The processor 196 and other components of the server 192 may similarly be coupled together with bus 191, a separate bus, or may be directly connected together or a combination of the foregoing. The memory 195 may contain executable code or software instructions that when executed by the one or more processors 196 to perform the methods described herein.

As illustrated in FIG. 14, the one or more processors 196 may include one or more processing units or components that implement the methodologies as described herein. For example, the one or more processors 196 may include a position determination processing unit (Pos. Det. 198), which is configured to obtain a position of the mobile device 100 with an associated uncertainty from the mobile device 100 via the external interface 193 or obtain a set of signals for position determination from the mobile device 100 via the external interface 193 and to determine a position of the mobile device 100, which has an associated uncertainty, based on the set of signals for position determination. As discussed above, the position of the mobile device 100 may be determined using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges or timing differences may be measured at mobile device 100 relative to three or more terrestrial transmitters fixed at known locations or relative to four or more satellites with accurately known orbital data, or combinations thereof, based at least in part, on pilots, positioning reference signals (PRS) or other positioning related signals transmitted by the transmitters or satellites and received at mobile device 100. Moreover, the distance travelled estimate that is to be determined is based on the position and position uncertainty, not on a particular minimum number of measurements. The position and position uncertainty may be determined using a reduced set of measurements, although the uncertainty may grow quickly. For example, the clock used in the receiver is relatively stable, and therefore over a few seconds the time error will not grow very quickly. Consequently, the distance travelled estimate may be based on positions determined using, e.g., three satellites (depending on signal strength, geometry, etc.).

The one or more processors 196 may further include a quality of displacement processing unit (QoD 200), which is configured to determine a quality of displacement between a base position and a newly determined position as discussed herein. The QoD 200 processing unit may determine the quality of displacement, for example, by determining the displacement between the base position and the new position and determining an aggregate of the uncertainties associated with each of the two positions. The quality of displacement may then be determined based on the determined displacement and aggregate of the associated uncertainties, e.g., as shown in equation 1, above.

The one or more processors 196 may further include a deviation in direction processing unit (Dev. Dir. 202), which is configured to determine the deviation in direction between two positions as discussed herein. The Dev. Dir. 202 processing unit may determine a deviation in direction, for example, by obtaining the direction of travel of each position, which may be determined by the Pos. Det. 198 processing unit, and determining the absolute value of the difference between the directions of travel.

The one or more processors 196 may further include a distance travelled update processing unit (DT Update 204), which is configured to update the distance travelled estimate based on the quality of displacement and the deviation in direction, if used. The updated distance travelled may be, for example, displayed on the user interface 194, stored in memory 195 for future use, and/or transmitted via external interface 193 to the mobile device 100. The DT Update 204 processing unit may be configured to update the distance travelled by comparing the quality of displacement from QoD 200 processing unit to one or more thresholds. If the quality of displacement exceeds a threshold, the DT Update 204 processing unit updates the distance travelled estimate based on the determined displacement between the base position and the new position. Moreover, the DT Update 204 processing unit may be configured to excise from the distance travelled estimate the displacement between the base position and a preceding position if the quality of displacement exceeds a threshold. If more than one threshold is used, the DT Update 204 processing unit may designate the new position as, e.g., a Tier 1 position if the quality of displacement exceeds a Tier 1 threshold, or a Tier 2 position if the quality of displacement exceeds a Tier 2 threshold. If the new position is a Tier 1 position, for example, DT Update 204 processing unit sets the new position as the base position. Additionally, if Dev. Dir. 202 processing unit is used, the DT Update 204 processing unit may be configured to compare the deviation in direction to a deviation threshold and if greater than the deviation threshold (and the quality of displacement greater than a threshold), the DT Update 204 processing unit determines the displacement between the new position and a previous position that is not necessarily the base position and updates the distance travelled estimate accordingly, and sets the new position to be the base position. The DT Update 204 processing unit may also be configured to use a Time Tier, where for each new periodically determined position a displacement based on a preceding position is excised from the distance travelled estimate and the distance travelled estimate is updated using the displacement between each new position and a previous position, e.g., Tier 1 or Tier 2 position.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 195, and are configured to cause the one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, an apparatus, such as the mobile device 100 or server 192 includes a means for obtaining a base position for the mobile device, the base position having an associated base uncertainty, which may be include, e.g., one or more processors 180, 196, including the Pos. Det. 182, 198 processing unit, as well as the DT Update 188, 204 processing unit. A means for obtaining a first set of signals for position determination with the mobile device may include, e.g., the SPS receiver 140 and/or transceiver 150, or external interface 193 of the server 192. Means for determining a first position of the mobile device with the first set of signals, the first position having an associated first uncertainty may include one or more processors 180, 196, including the Pos. Det. 182, 198 processing unit. Means for determining a first quality of displacement between the base position and the first position based on a displacement between the base position and the first position and the associated base uncertainty and the associated first uncertainty may include, e.g., one or more processors 180, 196, including the QoD 184, 200 processing unit. A means for updating the distance travelled estimate based on a displacement between the base position and the first position in response to the quality of displacement being greater than a threshold may include, e.g., one or more processors 180, 196, including the DT Update 188, 204 processing unit. Additionally, the mobile device may be configured to include a means for setting the first position of the mobile device to be the base position of the mobile device in response to the first quality of displacement being greater than the threshold, which may be, e.g., one or more processors 180, 196, including the DT Update 188, 204 processing unit.

The apparatus, such as the mobile device 100 or server 192, may be further configured to include a means for obtaining a second set of signals for position determination with the mobile device, which may include, e.g., the SPS receiver 140 and/or transceiver 150, or external interface 193 of the server. A means for determining a second position of the mobile device with the second set of signals, the second position having an associated second uncertainty may include, e.g., one or more processors 180, 196, including the Pos. Det. 182, 198 processing unit. A means for determining a second quality of displacement between the base position and the second position based on a displacement between the base position and the second position and the associated base uncertainty and the associated second uncertainty may include, e.g., one or more processors 180, 196, including the QoD 184, 200 processing unit. A means for excising the displacement between the base position and the first position from the distance travelled estimate and updating the distance travelled estimate based on the displacement between the base position and the second position in response to the second quality of displacement being greater than a second threshold that is greater than the threshold and setting the second position of the mobile device to be the base position of the mobile device in response to the second quality of displacement being greater than the second threshold may include, e.g., one or more processors 180, 196, including the DT Update 188, 204 processing unit.

The apparatus, such as the mobile device 100 or server 192, may further include a means for obtaining a second set of signals for position determination with the mobile device, which may include, e.g., the SPS receiver 140 and/or transceiver 150, or the external interface 193 of the server 192. A means for determining a second position of the mobile device with the second set of signals, the second position having an associated second uncertainty may include, e.g., one or more processors 180, 196, including the Pos. Det. 182, 198 processing unit. A means for determining a second quality of displacement between the base position and the second position based on a displacement between the base position and the second position and the associated base uncertainty and the associated second uncertainty may include, e.g., one or more processors 180, 196, including the QoD 184, 200 processing unit. A means for determining a first displacement vector between the base position and the first position and a second displacement vector between the first position and the second position may include, e.g., e.g., one or more processors 180, 196, including the Dev. Dir. 186, 202 processing unit. A means for determining an angle between the first displacement vector and the second displacement vector may include, e.g., e.g., one or more processors 180, 196, including the Dev. Dir. 186, 202 processing unit. A means for comparing the angle between the first displacement vector and the second displacement vector to a deviation threshold may include, e.g., e.g., one or more processors 180, 196, including the Dev. Dir. 186, 202 processing unit. A means for excising the displacement between the base position and the first position from the distance travelled estimate and updating the distance travelled estimate based on the displacement between the base position and the second position in response to the second quality of displacement being greater than a second threshold that is greater than the threshold and the angle being less than the deviation threshold may include, e.g., one or more processors 180, 196, including the DT Update 188, 204 processing unit. A means for updating the distance travelled estimate based on the displacement between the first position and the second position without excising the displacement between the base position and the first position from the distance travelled estimate in response to the second quality of displacement being greater than a second threshold that is greater than the threshold and the angle being greater than the deviation threshold may include, e.g., one or more processors 180, 196, including the DT Update 188, 204 processing unit.

The apparatus, such as the mobile device 100 or server 192, may further include a means for periodically determining positions of the mobile device using received signals, which may include, e.g., the one or more processors 180, 196, including the Pos. Det. 182, 198 processing unit. A means for excising a displacement between the first position and a preceding position for each new position if the displacement between the first position and a preceding position is included in the distance travelled estimate, and updating the distance travelled estimate based on the displacement between the new position and the first position may include, e.g., one or more processors 180, 196, including the DT Update 188, 204 processing unit.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of performing a distance travelled estimate with a mobile device, the method comprising:
    obtaining a base position for the mobile device, the base position having an associated base uncertainty;
    obtaining a first set of signals for position determination with the mobile device;
    determining a first position of the mobile device with the first set of signals, the first position having an associated first uncertainty;
    determining a first quality of displacement between the base position and the first position based on a displacement between the base position and the first position and the associated base uncertainty and the associated first uncertainty; and
    updating the distance travelled estimate based on the displacement between the base position and the first position in response to the first quality of displacement being greater than a threshold.

2. The method of claim 1, wherein the first quality of displacement between the base position and the first position is based on the displacement between the base position and the first position relative to an aggregate of the associated base uncertainty and the associated first uncertainty.

3. The method of claim 1, further comprising:
    setting the first position of the mobile device to be the base position of the mobile device in response to the first quality of displacement being greater than the threshold.

4. The method of claim 1, further comprising:
    obtaining a second set of signals for position determination with the mobile device;
    determining a second position of the mobile device with the second set of signals, the second position having an associated second uncertainty;

determining a second quality of displacement between the base position and the second position based on a displacement between the base position and the second position and the associated base uncertainty and the associated second uncertainty; and excising the displacement between the base position and the first position from the distance travelled estimate and updating the distance travelled estimate based on the displacement between the base position and the second position in response to the second quality of displacement being greater than the threshold.

5. The method of claim 1, further comprising:

obtaining a second set of signals for position determination with the mobile device;

determining a second position of the mobile device with the second set of signals, the second position having an associated second uncertainty;

determining a second quality of displacement between the base position and the second position based on a displacement between the base position and the second position and the associated base uncertainty and the associated second uncertainty;

excising the displacement between the base position and the first position from the distance travelled estimate and updating the distance travelled estimate based on the displacement between the base position and the second position in response to the second quality of displacement being greater than a second threshold that is greater than the threshold; and setting the second position of the mobile device to be the base position of the mobile device in response to the second quality of displacement being greater than the second threshold.

6. The method of claim 1, further comprising:

obtaining a second set of signals for position determination with the mobile device;

determining a second position of the mobile device with the second set of signals, the second position having an associated second uncertainty;

determining a second quality of displacement between the base position and the second position based on a displacement between the base position and the second position and the associated base uncertainty and the associated second uncertainty;

determining a first displacement vector between the base position and the first position and a second displacement vector between the first position and the second position;

determining an angle between the first displacement vector and the second displacement vector;

comparing the angle between the first displacement vector and the second displacement vector to a deviation threshold;

excising the displacement between the base position and the first position from the distance travelled estimate and updating the distance travelled estimate based on the displacement between the base position and the second position in response to the second quality of displacement being greater than a second threshold that is greater than the threshold and the angle being less than the deviation threshold; and updating the distance travelled estimate based on the displacement between the first position and the second position without excising the displacement between the base position and the first position from the distance travelled estimate in response to the second quality of displacement being greater than the second threshold that is greater than the threshold and the angle being greater than the deviation threshold.

7. The method of claim 1, further comprising:

repeatedly determining positions of the mobile device using received signals, wherein each new position has an associated uncertainty;

for each new position, determining a quality of displacement between the base position and the new position based on a displacement between the base position and the new position and the associated base uncertainty and the associated uncertainty for the new position;

for each new position, excising a displacement between the base position and a preceding position from the distance travelled estimate and updating the distance travelled estimate based on the displacement between the base position and the new position in response to the quality of displacement for the new position being greater than the threshold or a second threshold that is less than the threshold; and for each new position, setting the new position to be the base position of the mobile device in response to the quality of displacement for the new position being greater than the threshold.

8. The method of claim 1, wherein obtaining the base position for the mobile device comprises:

obtaining an initial set of signals for position determination with the mobile device; and determining the base position for the mobile device with the initial set of signals.

9. The method of claim 1, further comprising:

periodically determining positions of the mobile device using received signals; and for each new position, excising a displacement between the first position and a preceding position if included in the distance travelled estimate, and updating the distance travelled estimate based on the displacement between the new position and the first position.

10. The method of claim 1, wherein the first set of signals for position determination are obtained by the mobile device in a reduced power mode that yields less accurate position determination relative to a full power mode.

11. The method of claim 1, wherein the first set of signals for position determination are obtained from Satellite Positioning System satellites or terrestrial transmitters, or a combination thereof.

12. A mobile device configured to perform a distance travelled estimate, the mobile device comprising:

a receiver configured to receive signals for position determination; and one or more processing units configured to:

obtain a base position, the base position having an associated base uncertainty;

obtain a first set of signals for position determination from the receiver;

determine a first position with the first set of signals, the first position having an associated first uncertainty;

determine a first quality of displacement between the base position and the first position based on a displacement between the base position and the first position and the associated base uncertainty and the associated first uncertainty; and update the distance travelled estimate based on the displacement between the base position and the first position in response to the first quality of displacement being greater than a threshold.

13. The mobile device of claim 12, wherein the first quality of displacement between the base position and the first position is based on the displacement between the base position and the first position relative to an aggregate of the associated base uncertainty and the associated first uncertainty.

14. The mobile device of claim 12, wherein the one or more processing units is further configured to:
set the first position to be the base position in response to the first quality of displacement being greater than the threshold.

15. The mobile device of claim 12, wherein the one or more processing units is further configured to:
obtain a second set of signals for position determination from the receiver;
determine a second position with the second set of signals, the second position having an associated second uncertainty;
determine a second quality of displacement between the base position and the second position based on a displacement between the base position and the second position and the associated base uncertainty and the associated second uncertainty; and
excise the displacement between the base position and the first position from the distance travelled estimate and update the distance travelled estimate based on the displacement between the base position and the second position in response to the second quality of displacement being greater than the threshold.

16. The mobile device of claim 12, wherein the one or more processing units is further configured to:
obtain a second set of signals for position determination from the receiver;
determine a second position with the second set of signals, the second position having an associated second uncertainty;
determine a second quality of displacement between the base position and the second position based on a displacement between the base position and the second position and the associated base uncertainty and the associated second uncertainty;
excise the displacement between the base position and the first position from the distance travelled estimate and update the distance travelled estimate based on the displacement between the base position and the second position in response to the second quality of displacement being greater than a second threshold that is greater than the threshold; and
set the second position to be the base position in response to the second quality of displacement being greater than the second threshold.

17. The mobile device of claim 12, wherein the one or more processing units is further configured to:
obtain a second set of signals for position determination from the receiver;
determine a second position with the second set of signals, the second position having an associated second uncertainty;
determine a second quality of displacement between the base position and the second position based on a displacement between the base position and the second position and the associated base uncertainty and the associated second uncertainty;
determine a first displacement vector between the base position and the first position and a second displacement vector between the first position and the second position;
determine an angle between the first displacement vector and the second displacement vector;
compare the angle between the first displacement vector and the second displacement vector to a deviation threshold;
excise the displacement between the base position and the first position from the distance travelled estimate and updating the distance travelled estimate based on the displacement between the base position and the second position in response to the second quality of displacement being greater than a second threshold that is greater than the threshold and the angle being less than the deviation threshold; and
update the distance travelled estimate based on the displacement between the first position and the second position without excising the displacement between the base position and the first position from the distance travelled estimate in response to the second quality of displacement being greater than the second threshold that is greater than the threshold and the angle being greater than the deviation threshold.

18. The mobile device of claim 12, wherein the one or more processing units is further configured to:
repeatedly determine positions, wherein each new position has an associated uncertainty;
for each new position, determine a quality of displacement between the base position and the new position based on a displacement between the base position and the new position and the associated base uncertainty and the associated uncertainty for the new position; and
for each new position, excise a displacement between the base position and a preceding position from the distance travelled estimate and update the distance travelled estimate based on the displacement between the base position and the new position in response to the quality of displacement for the new position being greater than the threshold; and
for each new position, set the position to be the base position in response to the quality of displacement for the new position being greater than the threshold.

19. The mobile device of claim 12, wherein the one or more processing units is configured to obtain the base position by being configured to:
obtain an initial set of signals for position determination from the receiver;
determine the base position for the mobile device with the initial set of signals.

20. The mobile device of claim 12, wherein the one or more processing units is further configured to:
periodically determine positions of the mobile device; and
for each position, excise a displacement between the first position and a preceding position if included in the distance travelled estimate, and update the distance travelled estimate based on the displacement between the position and the first position.

21. The mobile device of claim 12, wherein the first set of signals for position determination are received by the receiver in a reduced power mode that yields less accurate position determination relative to a full power mode.

22. The mobile device of claim 12, wherein the receiver is a Satellite Positioning System receiver.

23. A mobile device configured to perform a distance travelled estimate, the mobile device comprising:
means for obtaining a base position for the mobile device, the base position having an associated base uncertainty;
means for obtaining a first set of signals for position determination with the mobile device;

means for determining a first position of the mobile device with the first set of signals, the first position having an associated first uncertainty;

means for determining a first quality of displacement between the base position and the first position based on a displacement between the base position and the first position and the associated base uncertainty and the associated first uncertainty; and means for updating the distance travelled estimate based on the displacement between the base position and the first position in response to the first quality of displacement being greater than a threshold.

24. The mobile device of claim 23, wherein the first quality of displacement between the base position and the first position is based on the displacement between the base position and the first position relative to an aggregate of the associated base uncertainty and the associated first uncertainty.

25. The mobile device of claim 23, further comprising: means for setting the first position of the mobile device to be the base position of the mobile device in response to the first quality of displacement being greater than the threshold.

26. The mobile device of claim 23, further comprising:

means for obtaining a second set of signals for position determination with the mobile device;

means for determining a second position of the mobile device with the second set of signals, the second position having an associated second uncertainty;

means for determining a second quality of displacement between the base position and the second position based on a displacement between the base position and the second position and the associated base uncertainty and the associated second uncertainty; and means for excising the displacement between the base position and the first position from the distance travelled estimate and updating the distance travelled estimate based on the displacement between the base position and the second position in response to the second quality of displacement being greater than a second threshold that is greater than the threshold and setting the second position of the mobile device to be the base position of the mobile device in response to the second quality of displacement being greater than the second threshold.

27. The mobile device of claim 23, further comprising:

means for obtaining a second set of signals for position determination with the mobile device;

means for determining a second position of the mobile device with the second set of signals, the second position having an associated second uncertainty;

means for determining a second quality of displacement between the base position and the second position based on a displacement between the base position and the second position and the associated base uncertainty and the associated second uncertainty;

means for determining a first displacement vector between the base position and the first position and a second displacement vector between the first position and the second position;

means for determining an angle between the first displacement vector and the second displacement vector;

means for comparing the angle between the first displacement vector and the second displacement vector to a deviation threshold;

means for excising the displacement between the base position and the first position from the distance travelled estimate and updating the distance travelled estimate based on the displacement between the base position and the second position in response to the second quality of displacement being greater than a second threshold that is greater than the threshold and the angle being less than the deviation threshold; and means for updating the distance travelled estimate based on the displacement between the first position and the second position without excising the displacement between the base position and the first position from the distance travelled estimate in response to the second quality of displacement being greater than the second threshold that is greater than the threshold and the angle being greater than the deviation threshold.

28. The mobile device of claim 23, further comprising:

means for periodically determining positions of the mobile device using received signals; and means for excising a displacement between the first position and a preceding position for each new position, if the displacement between the first position and the preceding position is included in the distance travelled estimate, and updating the distance travelled estimate based on the displacement between the new position and the first position.

29. A non-transitory computer readable medium having stored therein computer executable instructions executable by one or more processing units of a mobile device to:

obtain a base position for the mobile device, the base position having an associated base uncertainty;

obtain a first set of signals for position determination;

determine a first position for the mobile device with the first set of signals, the first position having an associated first uncertainty;

determine a first quality of displacement between the base position and the first position based on a displacement between the base position and the first position and the associated base uncertainty and the associated first uncertainty; and update a distance travelled estimate for the mobile device based on the displacement between the base position and the first position in response to the first quality of displacement being greater than a threshold.

30. The non-transitory computer readable medium of claim 29, wherein the first quality of displacement between the base position and the first position is based on the displacement between the base position and the first position relative to an aggregate of the associated base uncertainty and the associated first uncertainty.

31. The non-transitory computer readable medium of claim 29, further comprising computer executable instructions to:

set the first position for the mobile device to be the base position of the mobile device in response to the first quality of displacement being greater than the threshold.

32. The non-transitory computer readable medium of claim 29, further comprising computer executable instructions to:

obtain a second set of signals for position determination;

determine a second position for the mobile device with the second set of signals, the second position having an associated second uncertainty;

determine a second quality of displacement between the base position and the second position based on a displacement between the base position and the second position and the associated base uncertainty and the associated second uncertainty; and excise the displacement between the base position and the first position from the distance travelled estimate and update the distance travelled estimate based on the displacement between the base position and the second position in response to the second quality of displacement being greater than a second threshold that is greater than the threshold and set the second position for the mobile device to be the base position of the mobile device in response to the second quality of displacement being greater than the second threshold.

33. The non-transitory computer readable medium of claim 29, further comprising computer executable instructions to:

obtain a second set of signals for position determination;

determine a second position for the mobile device with the second set of signals, the second position having an associated second uncertainty;

determine a second quality of displacement between the base position and the second position based on a displacement between the base position and the second position and the associated base uncertainty and the associated second uncertainty;

determine a first displacement vector between the base position and the first position and a second displacement vector between the first position and the second position;

determine an angle between the first displacement vector and the second displacement vector;

compare the angle between the first displacement vector and the second displacement vector to a deviation threshold;

excise the displacement between the base position and the first position from the distance travelled estimate and updating the distance travelled estimate based on the displacement between the base position and the second position in response to the second quality of displacement being greater than a second threshold that is greater than the threshold and the angle being less than the deviation threshold; and update the distance travelled estimate based on the displacement between the first position and the second position without excising the displacement between the base position and the first position from the distance travelled estimate in response to the second quality of displacement being greater than the second threshold that is greater than the threshold and the angle being greater than the deviation threshold.

34. The non-transitory computer readable medium of claim 29, further comprising computer executable instructions to:

periodically determine positions of the mobile device using received signals; and excise a displacement between the first position and a preceding position for each new position if the displacement between the first position and the preceding position is included in the distance travelled estimate, and update the distance travelled estimate based on the displacement between the new position and the first position.

* * * * *